(12) United States Patent
Stoppe et al.

(10) Patent No.: US 10,838,184 B2
(45) Date of Patent: Nov. 17, 2020

(54) ARTEFACT REDUCTION FOR ANGULARLY-SELECTIVE ILLUMINATION

(71) Applicant: Carl Zeiss Microscopy GmbH, Jena (DE)

(72) Inventors: Lars Stoppe, Jena (DE); Moritz Schmidlin, Dietikon (CH); Gerhard Krampert, Pleasanton, CA (US); Kai Wicker, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 6 days.

(21) Appl. No.: 16/098,055

(22) PCT Filed: Apr. 26, 2017

(86) PCT No.: PCT/EP2017/059949
§ 371 (c)(1),
(2) Date: Oct. 31, 2018

(87) PCT Pub. No.: WO2017/191011
PCT Pub. Date: Nov. 9, 2017

(65) Prior Publication Data
US 2019/0155012 A1    May 23, 2019

(30) Foreign Application Priority Data
May 2, 2016   (DE) .................. 10 2016 108 079

(51) Int. Cl.
*H04N 5/225*    (2006.01)
*H04N 7/18*     (2006.01)
(Continued)

(52) U.S. Cl.
CPC ............ *G02B 21/06* (2013.01); *G02B 21/14* (2013.01); *G02B 21/26* (2013.01); *G02B 21/367* (2013.01);
(Continued)

(58) Field of Classification Search
None
See application file for complete search history.

(56) References Cited

U.S. PATENT DOCUMENTS

| | | |
|---|---|---|
| 2004/0070990 A1 | 4/2004 | Szypszak |
| 2013/0004065 A1 | 1/2013 | Ma |

(Continued)

FOREIGN PATENT DOCUMENTS

| | | |
|---|---|---|
| DE | 19514358 C2 | 4/2000 |
| DE | 102006027836 A1 | 12/2007 |

(Continued)

OTHER PUBLICATIONS

Xue, Tianfan, et al.; "A Computational Approach for Obstruction-Free Photography"; ACM Trans. Graph. Proc. ACM SIGGRAPH 2015; 1-11.

(Continued)

*Primary Examiner* — Christopher Braniff
(74) *Attorney, Agent, or Firm* — Duane Morris LLP

(57) ABSTRACT

An optical device includes a sample holder configured to fix an object in the beam path of the optical device, and an illumination module which has a plurality of light sources and configured to illuminate the object from a plurality of illumination directions by operating the light sources, wherein each illumination direction has an assigned luminous field. The optical device also has a filter arranged between the illumination module and the sample holder and configured to expand the assigned luminous field for each illumination direction. As a result, it is possible to reduce artefacts on account of contaminants during the angularly-selective illumination. Techniques of digital artefact reduction are also described. By way of example, the optical device can be a microscope.

12 Claims, 13 Drawing Sheets

(51) Int. Cl.
  *G02B 21/06* (2006.01)
  *G02B 21/36* (2006.01)
  *G02B 21/14* (2006.01)
  *G06T 5/00* (2006.01)
  *G06T 5/50* (2006.01)
  *G02B 21/26* (2006.01)

(52) U.S. Cl.
  CPC ............... *G06T 5/001* (2013.01); *G06T 5/50* (2013.01); *H04N 5/2256* (2013.01); *H04N 7/18* (2013.01); *G06T 2207/10056* (2013.01); *G06T 2207/30024* (2013.01)

(56) References Cited

U.S. PATENT DOCUMENTS

| | | | |
|---|---|---|---|
| 2013/0258090 A1* | 10/2013 | Steinmeyer | G02B 21/361 348/79 |
| 2014/0333997 A1 | 11/2014 | Oda | |
| 2017/0167856 A1* | 6/2017 | Stoppe | G01B 11/002 |

FOREIGN PATENT DOCUMENTS

| | | | |
|---|---|---|---|
| DE | 102014109687 | * | 1/2016 |
| DE | 102014110575 | A1 | 1/2016 |
| DE | 102014112242 | A1 | 3/2016 |
| EP | 2339534 | * | 6/2011 |
| EP | 2339534 | A1 | 6/2011 |
| JP | 2002189174 | A | 7/2002 |
| WO | 0225929 | A1 | 3/2002 |
| WO | 2006060509 | A1 | 6/2006 |
| WO | 2015114093 | A2 | 8/2015 |
| WO | 2016005571 | A1 | 1/2016 |

OTHER PUBLICATIONS

Chinese Office Action for CN 201780041423 dated Aug. 4, 2020.
English Translation of Chinese Office Action for CN 201780041423 dated Aug. 4, 2020.

* cited by examiner

ARTEFACT REDUCTION FOR ANGULARLY-SELECTIVE ILLUMINATION

RELATED APPLICATIONS

The present application is a U.S. National Stage application of International PCT Application No. PCT/EP2017/059949 filed on Apr. 26, 2017 which claims priority benefit of German Application No. DE 10 2016 108 079.9 filed on May 2, 2016, the contents of each are incorporated by reference in their entirety.

FIELD OF THE INVENTION

Various embodiments of the invention relate to an optical device having a filter, which is arranged between an illumination module of the optical device which has a plurality of light sources and a sample holder of the optical device and which is configured to expand the assigned luminous field for each illumination direction. Various further embodiments of the invention relate to a method in which an artefact reduction is carried out for each of a plurality of measurement images before the various measurement images are subsequently combined in order to obtain a result image. By way of example, the result image can have a phase contrast.

BACKGROUND

In the optical imaging of objects it may often be worthwhile to generate a so-called phase contrast image. In a phase contrast image, at least part of the image contrast is caused by a phase shift of the light through the imaged object. It is thus possible to image with comparatively higher contrast in particular such objects which bring about no or only a small attenuation of the amplitude of the light, but a significant phase shift (phase objects). Biological samples as object in a microscope may typically bring about a larger change in phase than change in amplitude of the electromagnetic field.

Various techniques for phase contrast imaging are known, for instance dark-field illumination, oblique illumination, differential interference contrast (DIC) or Zernike phase contrast. Further techniques would be e.g. the so-called knife edge method or helical phase contrast.

Such techniques mentioned above have various disadvantages or limitations. Thus, the DIC technique, the Zernike technique, the knife edge method and helical phase contrast typically necessitate providing, by comparison with conventional amplitude imaging, additional optical elements between sample and detector in the region of the so-called detection optics. This can lead to structural limitations particularly in the case of modularly constructed microscopes. Costs are typically increased. In the case of thin samples, typically only a few photons contribute to image generation in the case of dark-field illumination, which can lead to noisy images of lower quality. A subsequent evaluation or analysis of the images may not be possible, or may be possible only to a limited extent. Oblique illumination typically leads to an asymmetrical increase in contrast, which can in turn bring about a reduced quality of the images.

Therefore, techniques for generating a phase contrast image by digital post-processing are known as well. By way of example, DE 10 2014 112 242 A1 discloses techniques for generating a phase contrast image by combining a plurality of captured intensity images. In this case, the various intensity images are associated with different illumination directions. Such techniques are sometimes referred to as angularly-selective illumination.

In the case of phase contrast imaging by means of angularly-selective illumination it can happen that contaminants in the beam path adversely affect the quality of the phase contrast image. In particular, it has been observed that contaminants in the beam path can be manifested as an extensive pattern in the phase contrast image if they are arranged at a distance from a focal plane of an objective of the optical device (in defocused fashion).

Corresponding disadvantages can also occur for other imaging techniques in association with angularly-selective illumination, e.g. in association with bright-field imaging.

SUMMARY

Therefore, there is a need for improved techniques for imaging by means of angularly-selective illumination. Angularly-selective illumination is sometimes also referred to as structured illumination. In particular, there is a need for such techniques which make it possible to reduce artefacts on account of contaminants in the beam path.

This object is achieved by the features of the independent patent claims. The features of the dependent patent claims define embodiments.

In one example, an optical device includes a sample holder, an illumination module and a filter. The sample holder is configured to fix an object in the beam path of the optical device. The illumination module has a plurality of light sources. The illumination module is configured to illuminate the object from a plurality of illumination directions by operating the light sources. Each illumination direction has an assigned luminous field. The filter is arranged between the illumination module and the sample holder. The filter is configured to expand the assigned luminous field for each illumination direction.

By way of example, the optical device can be a microscope. It would be possible, for example, for the optical device to be configured for reflected-light imaging and/or for transmitted-light imaging. The optical device can have, for example, an eyepiece and/or an objective. The optical device could include, for example, a further illumination module, for example having a laser for fluorescence imaging.

The object can be for example a phase object, such as a biological sample, for example. By way of example, a corresponding biological sample could have one or more cell cultures.

The luminous field can describe for example the quantity of light for each associated illumination direction which is present at different points in the space. The luminous field can be associated e.g. with a propagation direction of the light. The luminous field can have for example a specific defined width between two edges; by way of example, the width of the luminous field can be defined perpendicular to the propagation direction. The luminous field can define e.g. the beam path. The beam path can have e.g. a central axis that is defined symmetrically with respect to the edges of the luminous field.

By expanding the luminous field, the width thereof can be increased. This means that the extent of the luminous field has the effect that light is present with a greater solid angle. What can thereby be achieved, for example, is that the object is illuminated from an extended solid angle which is centered for example around the respective illumination direction. As a result of the expanding, the luminous field of the different illumination directions can therefore have a comparatively large extent perpendicular to the light propagation direction in the region of the sample holder or of the object.

What can be achieved by such techniques is that artefacts in a result image on account of contaminants in the beam path are reduced or are removed (artefact reduction). In particular, artefacts in the result image on account of contaminants which are situated outside a focal plane of the optical device in the region of the sample holder can be reduced. In particular, it may be possible to reduce artefacts on account of contaminants situated outside the focal plane, while at the same time the quality of the imaging with respect to the object, which is arranged in the region of the focal plane of the optical device, is not, or not significantly, reduced. In this case, the quality of the imaging can be characterized for example by an edge sharpness of the object, a signal-to-noise ratio, image noise, etc.

Various filters can be used to achieve the expansion of the luminous field for the different illumination directions. By way of example, the filter could have a diffusing plate or be implemented as a diffusing plate. A particularly robust filter that is simple to produce can be used in this way.

By way of example, the diffusing plate could be implemented by a plastic plate. By way of example, it would be possible for one or more surfaces of the diffusing plate to have a roughened structure, i.e. for a surface having a significant topology to be present. In this case, a length scale of the topology of the surface can correlate with a length scale of the expansion of the luminous field. The filter can bring about the expansion of the luminous field for both transmission directions or else only for light which is incident on the filter from the illumination module.

It may be worthwhile for the filter to have a comparatively high transmittance for the light incident along the respective illumination direction. For example, the transmittance can be >50%, preferably >85%, particularly preferably >95%. What can be achieved thereby is that the provision of the filter does not cause the quality of the imaging to be reduced or significantly reduced.

For example, it would be possible for a surface of the diffusing plate to form a significant angle with a central axis of the beam paths which are associated with the different illumination directions. For example, it would be possible for said angle to be 50°, preferably more than 70°, particularly preferably more than 85°. Such a perpendicular arrangement makes it possible to reduce the reflection on the surface of the filter and to increase the transmittance.

For example, it would be possible for the diffusing plate to be positioned near the illumination module. For example, a distance between a surface of the diffusing plate and the illumination module could be smaller than an extent of the surface of the diffusing plate. For example, a distance between a surface of the diffusing plate and the illumination module could be smaller than the width of the luminous field for different illumination directions upstream or optionally downstream of the filter.

In one example, it would be possible for the illumination module to have a carrier, on which the light sources are fitted. It would then be possible for the filter to be rigidly coupled to the carrier. In one such example, it may be possible to position the filter in particularly close local relationship with respect to the illumination module. A particularly efficient expansion of the luminous field of the different illumination directions can be achieved as a result. Furthermore, the filter can be arranged efficiently in respect of structural space.

The optical device can furthermore have the detector, e.g. a complimentary metal-oxide-semiconductor, used as an image sensor and commonly referred to as a "CMOS" detector or a charge coupled device ("CCD") detector or a photomultiplier. The detector can have an array of pixels. The detector can be arranged in the beam path of the optical device. The optical device can also have a computing unit. The computing unit can be configured to control the illumination module for illuminating the object from a plurality of measurement illumination directions. The computing unit can furthermore be configured to control the detector for capturing measurement images of the object. In this case, the measurement images are assigned to the measurement illumination directions. The computing unit can furthermore be configured to combine the measurement images in order to obtain a result image.

Different assignments between the measurement illumination directions and the measurement images are possible in the various examples described herein. By way of example, a 1:1 assignment would be possible. By way of example, the computing unit could be configured to control the detector for capturing a respective measurement image of the object for each of the measurement illumination directions. However, a different assignment would also be possible: by way of example, the computing unit could be configured to control the detector such that a measurement image is assigned to more than one measurement illumination direction. In the case of a 1:n assignment where n>2, the imaging speed can be increased: that may be worthwhile particularly in the case of bright-field imaging.

By way of example, it would be possible for the result image to have a phase contrast. However, it would also be possible for the result image to have no, or no significant, phase contrast. By way of example, traditional bright-field imaging can be operated in this case.

In the case of bright-field imaging, it would be possible, for example, for the computing unit to be configured to control the illumination module for illuminating the object from a plurality of measurement illumination directions in a time-parallel manner. The computing unit can then furthermore be configured to control the detector for capturing a result image. The result image can have a bright-field contrast since an illumination is carried out simultaneously from different illumination directions. In this case, it may be worthwhile, for example, to illuminate the object as uniformly as possible from the different spatial directions. This may necessitate activating a large number or all of the available light sources in a time-parallel manner.

The different measurement illumination directions can correspond to the selective activation of different light sources of the illumination module. By way of example, the object can be illuminated sequentially from the different measurement illumination directions. Alternatively or additionally it would be possible for the different measurement illumination directions to be assigned to different colors and/or polarizations, such that it is possible in this way to effect a separation between the different illumination directions for the measurement images. During sequential illumination, per sequence step in each case one or more illumination directions can be implemented by operating one or more light sources, i.e. a 1:n assignment where n>=1 can be implemented. In this case, n can vary or be identical for different measurement images.

In this case, it may be possible, for example, for illumination directions that are different as much as possible to be used for the different measurement images, i.e. illumination directions that form a large angle with one another. What can be achieved thereby is that the result image has particularly strong phase contrast with respect to the object. In this case, it is possible to apply for example techniques such as are known in principle from DE 10 2014 112 242 A1; the corresponding disclosure content is incorporated by cross-reference herein.

In accordance with such examples described above which are based on the use of a filter that expands the corresponding luminous field for each illumination direction, a particularly rapid, hardware-implemented reduction of artefacts associated with contaminants can be carried out. In particular, with regard to the artefact reduction it may be unnecessary to carry out an additional digital post-processing of the measurement images and/or of the result image. The hardware implementation of the artefact reduction makes it possible to prevent an additional latency from being introduced into the digital post-processing on account of further processing steps. As a result, it may be possible to provide result images particularly rapidly; in particular, it may be possible to implement real-time applications of the phase contrast imaging.

Such examples described above concerning the use of a filter for hardware-based artefact reduction can be replaced by or combined with techniques of digital artefact reduction. In the case of digital artefact reduction, it may be possible, in the context of the digital post-processing, to reduce artefacts on account of contaminants arranged in defocused fashion in the beam path of the optical device. The various examples concerning the digital artefact reduction and the hardware-implemented artefact reduction can be combined with one another.

In one example, a method includes driving an illumination module of an optical device for illuminating, for example sequentially, an object from a plurality of measurement illumination directions. The illumination module has a plurality of light sources. The method furthermore includes: driving a detector of the optical device for capturing measurement images of the object, wherein the measurement images are assigned to the measurement illumination directions. The method also includes, for each measurement image: carrying out an artefact reduction which reduces an artefact in the respective measurement image on account of a contaminant arranged in defocused fashion. The method further includes, after carrying out the artefact reduction for each measurement image: combining the measurement images in order to obtain a result image.

By way of example, it would be possible for the result image to have a phase contrast. However, it would also be possible for the result image to have no, or no significant, phase contrast. By way of example, traditional bright-field imaging can be operated in this case.

By way of example, an assigned measurement image could be captured for each measurement illumination direction. It would also be possible for more than one measurement illumination direction to be activated for at least some measurement images. A 1:n assignment where n>=1 can thus be implemented. In this case, n can vary or be identical for different measurement images.

As an alternative or in addition to a sequential illumination of the object from the plurality of measurement illumination directions, it would also be possible to achieve a separation of the illumination directions for the measurement images by way of the color (or spectral range) and/or the polarization of the light which is associated with the different measurement illumination directions.

With regard to combining the measurement images in order to obtain the result image, once again it is possible to apply techniques such as are known in principle from DE 10 2014 112 242 A1. As a result, it is possible to generate a phase contrast for the result image. For example, a number of two, four, eight or more measurement images can be captured and combined with one another in order to obtain the result image. In this case, by way of example, weighted sums can be used. In this case, corresponding weighting factors can assume positive and/or negative values.

What can be achieved by carrying out the artefact reduction with respect to each measurement image is that the result image has no, or no significant, artefacts on account of contaminants. In particular, the early artefact reduction with respect to each measurement image makes it possible to prevent a situation in which, on account of the combination of the different measurement images in order to obtain the result image, the artefacts from the different measurement images are transferred to the result image.

In this case, various techniques can be used for carrying out the artefact reduction. In one example, it would be possible for the artefact reduction to be carried out solely on the basis of information obtained from the different measurement images; this may mean that it is not necessary to capture additional reference images of the object in order to carry out the artefact reduction. By way of example, a soft-focus filter could be employed in regions outside the object in order to reduce the artefacts. This may afford the advantage of a reduced exposure of the object to light, which may be advantageous for example with regard to biological samples. Moreover, the time duration required for carrying out the measurement until obtaining the result image (measurement duration) can be reduced as a result.

In other examples, however, it would also be possible to take account of additional information—over and above the measurement images—for carrying out the artefact reduction. For example, it would be possible for the method to further include for each measurement image: driving the illumination module for illuminating—for example sequentially—the object from at least one assigned reference illumination direction. The method can then include, for each reference illumination direction: driving the detector for capturing a reference image of the object. The method can then also include, when carrying out the artefact reduction, for each measurement image: combining the respective measurement image with the at least one assigned reference image in order to obtain at least one correction image which is indicative of the artefact.

In other words, it may thus be possible that, for each measurement image, in each case one or more assigned reference images are captured for corresponding reference illumination directions. On the basis of said reference images, it may be possible to obtain for each measurement image one or more correction images indicating the artefact in the respective measurement image; on the basis of the correction images, it may then be possible to identify the artefact in the respective measurement image and, on the basis thereof, to correct the respective measurement image in order to remove the artefact or to reduce an influence of the artefact on the measurement image.

Such techniques may in particular exploit the fact that as a result of the defocused arrangement of the contaminant, it is possible to obtain a characteristic position change of the artefact in the different reference images—in particular in comparison with the position change of the object in the different reference images. Through a suitable choice of the reference illumination directions, it may be possible to configure this position change of the artefact in a particularly characteristic manner, which may enable a particularly accurate identification of the artefact in the measurement image.

For example, what may be achieved is that between the at least one reference image and the associated measurement image the artefact has a larger position change than the object itself. In particular, through a suitable choice of the reference illumination directions, it may be possible that the object has no, or no significant, position change between the at least one reference image and the associated measurement image; while the artefact has a significant position change between the at least one reference image and the associated measurement image.

On account of the characteristic position change, by combining the respective measurement image with the at least one assigned reference image it is possible to obtain the correction image in such a way that the correction image is indicative of the artefact. In particular, it may be possible for the artefacts to have a greater intensity than the respective objects in the different correction images. Therefore, on the basis of an intensity threshold value, the artefacts can be separated from other image constituents, such as, for example, the object or the background.

By using the reference images, it is possible to obtain additional information about the artefact. In particular, it may be possible to isolate the artefact from other constituents of the measurement image for example the object and the background. As a result, the artefact reduction can be carried out particularly accurately, without other image constituents being adversely influenced.

For example, it would be possible for the method to include, when carrying out the artefact reduction, for each correction image: applying an image segmentation on the basis of an intensity threshold value in order to obtain an isolated artefact region in the correction image. The artefact region can include the artefact. It may then be possible, when carrying out the artefact reduction, for each measurement image, to remove the artefact on the basis of the artefact region of the respective correction image.

By means of the image segmentation, it is possible to decompose the respective correction image into two or more continuous regions. In this case, the different continuous regions can be defined with respect to the intensity threshold value. The intensity threshold value can take account of positive and/or negative amplitudes—for instance a comparison with a center point of the intensity values of different pixels of the respective correction image. With respect to the intensity threshold value it is also possible to take account of tolerances, for example in order to ensure transitions between the different continuous regions in accordance with specific boundary conditions. As a result of the image segmentation it is possible to obtain the artefact region, which makes it possible to mark the artefact in the correction image. By virtue of such a marking, it may then be possible particularly easily to reduce the artefact in the measurement image.

In various examples, it is possible for in each case a single reference image to be captured per measurement image. It may then be possible to carry out a particularly rapid artefact reduction without significantly lengthening the measurement duration. Real-time applications are possible, for example. At the same time, however, it may be possible for the accuracy of the artefact reduction to be limited by the limited number of reference images. Therefore, in other examples it may be possible for more than a single reference image to be captured per measurement image, for example a number of two, three or four reference images.

In one example, the contaminants can have scatterers and absorbers. Typically, both scatterers and absorbers have a high intensity in the captured images; in this case, however, a sign of the amplitude is different for scatterers and absorbers, e.g. with respect to a mean value of the amplitudes of the different pixels and/or with respect to a value of the amplitudes of pixels which image the background. This means that it is possible, for example, for scatterers to appear with bright contrast in the image; while absorbers appear with dark contrast in the image. In such an example, in particular, it may be possible for more than a single reference image to be captured per measurement image in order to carry out as accurate an artefact reduction as possible both for the artefacts on account of scatterers and for the artefacts on account of absorbers.

For example, it would then be possible to carry out, for each correction image, a correction of the respective artefact region on the basis of the artefact region of a further correction image. In this case, it is possible to carry out the correction of the artefact region for such pairs of correction images which are associated with the same measurement image.

For example, the correction of the different artefact regions could serve for separating artefact regions which are assigned either to scatterers or to absorbers. As a result, it may be possible to correct the measurement image particularly accurately; in particular, it is possible to avoid a mixing of artefacts on account of scatterers or absorbers.

A description has been given above of techniques in which a correction image that is indicative of the artefact is obtained on the basis of a combination of the respective measurement image with the at least one assigned reference image. In addition, or as an alternative to such techniques, other implementations of the artefact reduction are also possible.

In one example, the method includes, for each measurement image: driving the illumination module for illuminating, for example sequentially, the object from an assigned sequence of reference illumination directions. For each reference illumination direction, the method further includes: driving the detector for capturing a reference image of the object. When carrying out the artefact reduction, the method also includes, for each measurement image: identifying a movement of the artefact as a function of the respective sequence of the reference illumination directions in the assigned reference images. The respective artefact reduction is based on the respectively identified movement of the artefact.

The sequence of reference illumination directions can also be processed at least partly in a time-parallel manner, e.g. by superimposition of light having different colors and/or different polarizations. The different reference images can be separated in this way.

In this case, it is possible to configure the movement of the artefact as a function of the respective sequence in a characteristic manner. In particular, it is possible for the movement of the artefact to include a sequence of incremental position changes for the sequence of the reference illumination directions, wherein the movement of the artefact that is formed in this way is different than the corresponding movement of the object as a function of the respective sequence. In particular, it may be possible that, through a suitable choice of the reference illumination directions, a particularly small or no movement of the object is obtained as a function of the sequence. The movement of the artefact can be adapted by a suitable choice of the sequence.

By way of example, it would be possible to identify the movement of the object and/or the movement of the artefact as a function of the respective sequence of the reference illumination directions on the basis of image segmentation and/or edge recognition techniques. By way of example, alternatively or additionally it would be possible to identify the movement of the object and/or the movement of the artefact on the basis of prior knowledge. For example, the prior knowledge depending on the reference illumination directions can describe, for example qualitatively or quantitatively, the expected movement of the object and/or of the artefact. By way of example, it would be possible to identify the movement of the object and/or the movement of the artefact on the basis of an optimization. For example, for instance in combination with the abovementioned techniques of image segmentation, edge recognition and/or prior knowledge, an iterative optimization that determines the movement of the object and/or the movement of the artefact could be carried out. The optimization can be associated with a termination criterion, for example, which concerns for example the required time duration, the number of iterations and/or an accuracy of the correspondence to the prior knowledge.

By way of example, XUE, T., RUBINSTEIN M., LIO C., FREEMAN W. T. "A computational approach for obstruction-free photography" in ACM Trans. Graph. Proc. ACM SIGGRAPH 2015, 34 (2015) 79, discloses techniques for separating a reflective foreground or a concealing foreground of an image from a background of the image. This makes use of a movement of the camera and a resultant movement of the foreground in comparison with the background in order to carry out the separation. By way of example, it is possible to make use of a parallax of the movement between foreground and background in order to carry out the separation. Techniques of edge recognition and iterative optimization are carried out here; cf. ibid.: FIG. 3.

The corresponding disclosure of said article is incorporated by cross-reference herein. In particular, it is possible also to carry out corresponding techniques for the present separation of the artefact from the object. It should be understood here that, in the present case, no movement of the detector is used to induce the movement of the artefact; rather, the sequence of the reference illumination directions is used to induce the movement of the artefact. It has nevertheless been recognized that it is possible to use corresponding techniques for identifying the movement and for carrying out the artefact reduction.

It is then possible for the method to include, when carrying out the artefact reduction, for each measurement image: combining the respective measurement image with at least one of the assigned reference images on the basis of the identified movement of the artefact. The combining can make it possible, for example, to remove the artefact and to reconstruct image regions concealed by the artefact in the measurement image. As a result, the artefact reduction can be carried out with a high accuracy.

Such techniques which are based on the movement of the artefact typically have the effect of a particularly high accuracy of the artefact reduction. At the same time, however, the required computing power may be comparatively high; furthermore, it may be necessary for the sequence of reference illumination directions to include a very large number of reference illumination directions, e.g. more than five or more than ten reference illumination directions—, such that capturing the corresponding reference images may demand a comparatively long time duration.

Through a suitable choice of the reference illumination directions, it may be possible to suitably configure the position change of the artefact between the measurement image and a reference image or between different reference images. In particular, through a suitable choice of the reference illumination directions, it may be possible for this position change of the artefact to be configured in a characteristic manner relative to a corresponding position change of the object. This characteristic position change of the artefact can be utilized in the artefact reduction. A description is given below of techniques which achieve such a suitable choice of the reference illumination directions.

By way of example, it would be possible for the at least one measurement illumination direction which is assigned to a selected measurement image to form a first average angle with the other measurement illumination directions. Said at least one measurement illumination direction of the selected measurement image can form a second average angle with the assigned at least one reference illumination direction, said second average angle being smaller than the first average angle.

It may thus be possible for the different measurement illumination directions to form a comparatively large angle with one another; while the different reference illumination directions that are assigned to a specific measurement image form a comparatively small angle with one another. By way of example, it would be possible for the different measurement illumination directions which are assigned to different measurement images to form an angle with one another that is greater than 20°, preferably >30°, particularly preferably >40°. By way of example, it would be possible for the different reference illumination directions which are assigned to a specific measurement image to form an angle with one another which is less than 40°, preferably <30°, particularly preferably <20°. For example, it would be possible for the different reference illumination directions which are assigned to a specific measurement image to form an angle with one another which is less than 15°, preferably <10°, particularly preferably <5°.

What is achieved by means of the comparatively small dimensioning of the angle formed by the at least one reference illumination direction and the at least one measurement illumination direction is that the object has a comparatively small position change between the measurement image and the reference image; this is the case since the object is typically arranged in the focal plane (in a focused manner). At the same time, however, the artefact arranged in a defocused manner can have a significant position change. In this way, an accurate separation of artefact and object can be carried out and the artefact reduction can be operated accurately.

For example, a particularly small dimensioning of the average angle formed by the different reference illumination directions which are assigned to a specific measurement image can be achieved by means of suitable driving of the illumination module or of the different light sources of the illumination module. For example, it would be possible for the at least one measurement illumination direction which is assigned to the selected measurement image and the assigned at least one reference illumination direction to correspond to nearest neighbour light sources of the illumination module. For example, it would thus be possible for adjacent light sources of the illumination module to be used for generating the measurement image and the assigned reference images. Accordingly, it may be possible to use non-closest light sources of the illumination module for generating the different measurement images; this may mean that non-adjacent light sources of the illumination module— that is to say for example light sources of the illumination module between which further light sources are arranged— are used for the different measurement illumination directions.

As a result, it is possible to achieve a comparatively small dimensioning of the average angle formed by the different reference illumination directions with one another and with the respective at least one measurement illumination direction for a specific measurement image. What can be achieved by means of the comparatively small dimensions of said angle is that a position change of the object arranged in a focused manner between the measurement image and the at least one reference image or between different reference images is comparatively small. At the same time, however, the position change of the artefact may be comparatively large since the artefact arises on account of a contaminant which is not arranged in the focal plane of the optical device.

In general it may be possible for the reference illumination directions to be at least partly different than the measurement illumination directions. This may mean that light sources of the illumination module that are controlled for generating the measurement images are different than those controlled for generating the reference images. As a result, it may be possible for the information content on which the artefact reduction is based to be particularly large.

In other examples, however, it would also be possible for the reference illumination directions and the measurement illumination directions to be chosen to be at least partly identical. In such a case, it may be possible, for example, that for a specific measurement image one or more other measurement images are used as the at least one reference image assigned to the specific measurement image. In this way it may be possible that the measurement duration can be dimensioned to be particularly short, such that rapid imaging is possible. The measurement duration can be dimensioned to be short since no or a small number of dedicated reference images need be captured.

In the various examples described herein, it may be worthwhile, in particular, for the object—in contrast to the contaminant—to be arranged in a focal plane of the optical device, that is to say to be arranged in a focused manner. Specifically, what can be achieved in this way is that the position change which is observed between the respective measurement image and the at least one reference image for the artefact is characteristic in comparison with the corresponding position change of the object. What can be achieved by arranging the object in the focal plane is, for example, that the position change of the object is dimensioned to be comparatively small. Therefore, it would be possible, for example, for the method to further include: driving the sample holder of the optical device for focusing the object.

In principle, it would be possible for the artefact reduction to be carried out multiple times and iteratively for each measurement image. For example, it would be possible for the artefact reduction to be carried out until a specific convergence criterion is satisfied. For example, the convergence criterion can be defined in relation to: number of iterations; signal-to-noise ratio; and/or duration for carrying out the artefact reduction. In this way, a particularly accurate artefact reduction can be ensured; while at the same time the measurement duration is not lengthened unnecessarily.

In particular, in the various examples described herein it is possible for carrying out the artefact reduction to take place in real time. In this way, it may be possible, for example in association with an optical microscope, to image specific real-time processes, for instance the behavior of cell cultures, of the object in an artefact-reduced manner.

In one example, an optical device has a sample holder, an illumination module, a detector and a computing unit. The sample holder is configured to fix an object in the beam path of the optical device. The illumination module has a plurality of light sources. The illumination module is configured to illuminate the object from a plurality of illumination directions by operating the light sources. The detector is arranged in the beam path of the optical device. The computing unit is configured to control the illumination module for illuminating—for example time-sequentially—an object from a plurality of measurement illumination directions. The computing unit is furthermore configured to control the detector for capturing measurement images of the object, wherein the measurement images are assigned to the measurement illumination directions. The computing unit is furthermore configured, for each measurement image, to carry out an artefact reduction which reduces an artefact in the respective measurement image on account of a contaminant arranged in defocused fashion. The computing unit is configured, after carrying out the artefact reduction for all the measurement images, to combine the measurement images in order to obtain a result image. The result image can have e.g. a phase contrast.

For such an optical device it is possible to achieve effects that are comparable with the effects that can be achieved for a method in accordance with further examples.

By way of example, the optical device can be configured to carry out the method in accordance with further examples.

In the various examples described herein, different illumination modules can be used for implementing the angularly-selective illumination or a structured illumination pupil. For example, the illumination module could have a carrier, on which the light sources are fitted in a matrix structure. In this case, the matrix structure could have for example different unit cells; for example, the matrix structure could have a square, rectangular or hexagonal unit cell. The number of light sources provided can vary. For example, it would be possible for the illumination module to have more than 10 light sources, preferably more than 20 light sources, particularly preferably more than 50 light sources. In this case, different light sources can be used. It would be possible, for example, for the light sources to be selected from the following group: halogen light sources; light emitting diodes; solid-state light emitting diodes; and organic light emitting diodes.

The properties, features and advantages of this invention described above and the way in which they are achieved will become clearer and more clearly comprehensible in association with the following description of the exemplary embodiments which are explained in greater detail in association with the drawings. By way of example, it would be possible to combine the various examples described above concerning the use of a filter with techniques of artefact correction by digital post-processing.

DETAILED DESCRIPTION OF EMBODIMENTS

Figure 1A:
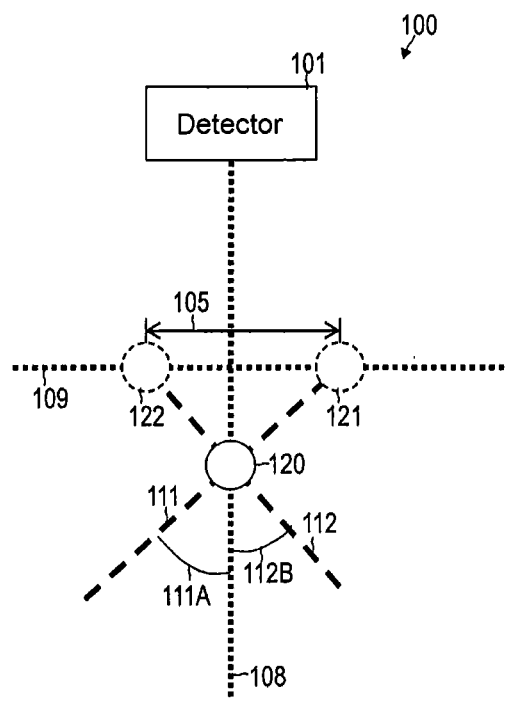
FIG. 1A schematically illustrates the illumination of a contaminant arranged in a defocused manner from different illumination directions and an associated position change in corresponding measurement images in accordance with various embodiments.

The present invention is explained in greater detail below on the basis of preferred embodiments with reference to the drawings. In the figures, identical reference signs designate identical or similar elements. The figures are schematic representations of different embodiments of the invention. Elements illustrated in the figures are not necessarily depicted as true to scale. Rather, the different elements illustrated in the figures are reproduced in such a way that their function and general purpose become comprehensible to the person skilled in the art. Functional units may be implemented as hardware, software or a combination of hardware and software.

Techniques in association with the angularly-selective illumination of an object are described below. The angularly-selective illumination can be used e.g. to implement bright-field imaging with a structured illumination pupil. The techniques described herein can alternatively or additionally be used in association with phase contrast imaging, wherein the phase contrast imaging can be carried out by digital post-processing of a plurality of measurement images obtained for different measurement illumination directions. Such techniques are often also referred to as digital phase contrast imaging with a structured illumination pupil.

Such techniques can be used for example in association with the microscopy of sample objects. By way of example, such techniques can be used in association with the real-time imaging of sample objects. In this case, it may be possible, for example, to implement fluorescence imaging. The techniques of phase contrast imaging as described herein can be applied in particular in association with biological sample objects having a high phase contrast, but only a limited amplitude contrast. In general, the techniques described herein can be used e.g. for phase objectives.

The techniques described herein are based on the insight that artefacts can often be amplified during imaging with structured illumination. In the case of angularly-selective illumination, discretely arranged light sources are typically used, e.g. the light sources could be arranged in a matrix arrangement. The discrete distribution of the light sources gives rise to gaps in the illumination pupil. Said gaps can result in artefacts in the image that arises in the case of defocused objects. This effect can occur both in traditional bright-field imaging and in phase contrast imaging.

Particularly in phase contrast imaging, such an amplification of artefacts can take place on account of the combination of the different measurement images in order to obtain a result image in the context of digital phase contrast imaging. For example, it has been observed that the artefacts present in a corresponding result image can describe extensive patterns that can correlate for example with the structured illumination used. The pattern can be an image of the illumination structure; for example, in the case of a rasterized LED array, a rasterized artefact can thus arise for each grain of dust arranged in a defocused manner. On account of the extensive patterns, such artefacts can reduce the usability of the corresponding result image or decrease the information content of the corresponding result image. As a result, the physico-technical information content of the result image without an artefact reduction in accordance with the techniques described herein may be particularly limited.

In the various examples described herein, techniques of artefact reduction can be implemented on the basis of hardware features and/or on the basis of software features. For example, it is possible for the artefact reduction to be implemented on the basis of a filter, wherein the filter carries out an expansion of the luminous field that is assigned to a specific illumination direction. By way of example, a plastic diffusing plate can be used as a filter, said diffusing plate being arranged near the illumination module. As a result, the digital post-processing can optionally be carried out by combining the measurement images to form a result image in accordance with previously known techniques of digital phase contrast imaging. In further examples, it is possible for the artefact reduction to be carried out on the basis of the digital post-processing of measurement images that are combined to form the result image. The artefact reduction can be carried out for individual measurement images in order to prevent an amplification of the artefacts upon combination to form the result image. This may make use for example of the fact that for different reference images which are associated with a specific measurement image and which are captured for different reference illumination directions, a position change of the artefact is characteristic in comparison with a position change of the object. As a result, it is possible for example, for instance on the basis of image segmentation techniques, to determine an artefact region having the artefact. It may then be possible to isolate or to remove the artefact in the respective measurement image. However, it is also possible, for example, to mark the artefact by taking account of a movement of the artefacts in accordance with a sequence of reference illumination directions.

FIG. 1A describes aspects with respect to a position change 105 of an artefact 121, 122 depending on the illumination direction 111, 112. By way of example, an associated measurement image can be captured for each illumination direction or a measurement image assigned to both illumination directions 111, 112 is captured.

For example, it would be possible that in the case of illumination along an illumination direction 111, a detector 101 of a corresponding optical device 100 captures a first measurement image, wherein an artefact 121 appears at a first position in the first measurement image (illustrated in FIG. 1A to the right of the optical axis 108). It would correspondingly be possible that in the case of illumination along the illumination direction 112, the detector 101 captures a second measurement image, wherein an artefact 122 appears at a second position in the second measurement image. The artefacts 121, 122 are caused by the same contaminant 120. The contaminant 120 is arranged at a distance from a focal plane 109 of an imaging optical unit of the optical device 100 (not illustrated in FIG. 1A), i.e. is arranged in a defocused manner. FIG. 1A reveals that the position change 105 between the artefacts 121, 122 in the two measurement images results on account of this contaminant 120 arranged in a defocused manner.

In principle, such artefacts 121,122 may be observed for contaminants 120 in the form of scatterers or absorbers. Typically, artefacts 121,122 for contaminants 120 in the form of scatterers appear with bright contrast in the corresponding image; while artefacts 121,122 for contaminants 120 in the form of absorbers appear with dark contrast in the corresponding image.

The position change 105 is given by:

$$\Delta x = \Delta z \cdot \frac{\sin(\alpha + \beta)}{\cos\alpha\cos\beta}, \quad (1)$$

wherein α denotes the angle 111A of the illumination direction 111 with the optical axis 108, β denotes the angle 112A of the illumination direction 112 with the optical axis 108, and Δz denotes the distance between the contaminant 120 and the focal plane 109.

Equation 1 can be derived as follows. For the scenario in FIG. 1A it holds true that:

$$\Delta z = a \cdot \cos\alpha = b \cdot \cos\beta, \quad (2)$$

wherein a denotes a distance between the contaminant 120 and the imaging location of the artefact 121 along the illumination direction 111, and b denotes a distance between the contaminant 120 and the imaging location of the artefact 122 along the illumination direction 112 (a and b are not illustrated in FIG. 1A).

By applying the sine law for general triangles, the following is obtained:

$$\frac{\Delta x}{\sin(\alpha + \beta)} = \frac{b}{\sin(90° - \alpha)} = \frac{b}{\cos\alpha}. \quad (3)$$

Equation (1) is obtained from a combination of equations (2) and (3). Corresponding techniques are also known from DE 10 2014 109 687 A1, the corresponding disclosure of which is incorporated by cross-reference herein.

Equation 1 reveals that a larger position change 105 is obtained for a greater defocusing of the contaminant 120, or for larger angles 111A, 112A.

Figure 1B:
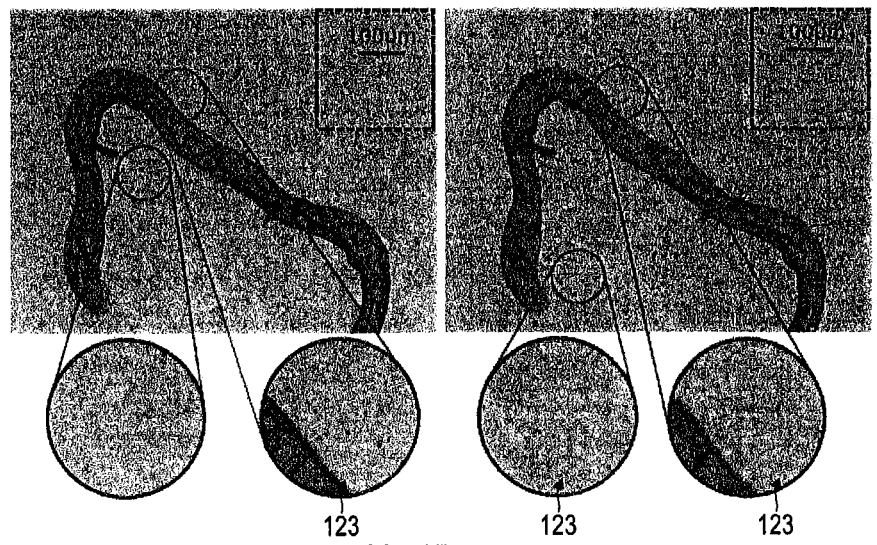
FIG. 1B schematically illustrates a result image determined on the basis of a combination of a plurality of measurement images and having artefacts on account of the contaminant arranged in a defocused manner.

FIG. 1B illustrates aspects with regard to a corresponding artefact 123 on the basis of actual measurement data. The example in FIG. 1B illustrates in particular two result images obtained by combination of individual measurement images captured for different illumination directions 111, 112. In the example in FIG. 1B it is evident that the artefact 123 expands or is amplified to form a pattern; this pattern images the structured illumination since the position changes 105 between the individual artefacts correlate with the different illumination directions 111, 112 used (cf. FIG. 1A). The different illumination directions 111, 112 in turn correlate with the illumination module used, which has a plurality of light sources in a matrix structure; said matrix structure is imaged in the artefacts 123.

By way of example, corresponding artefacts can also occur in association with bright-field imaging. In the case of bright-field imaging, typically a plurality of light sources of a corresponding illumination module are activated per measurement image.

A description is given below of techniques for reducing corresponding artefacts 121-123. With regard to FIGS. 2 and 3A, a hardware implementation of a corresponding artefact reduction is illustrated. In this case, FIG. 2 illustrates aspects with regard to a luminous field 215 of the illumination direction 111 for a reference implementation in which no filter is used for expanding the luminous field 215.

Figure 2:
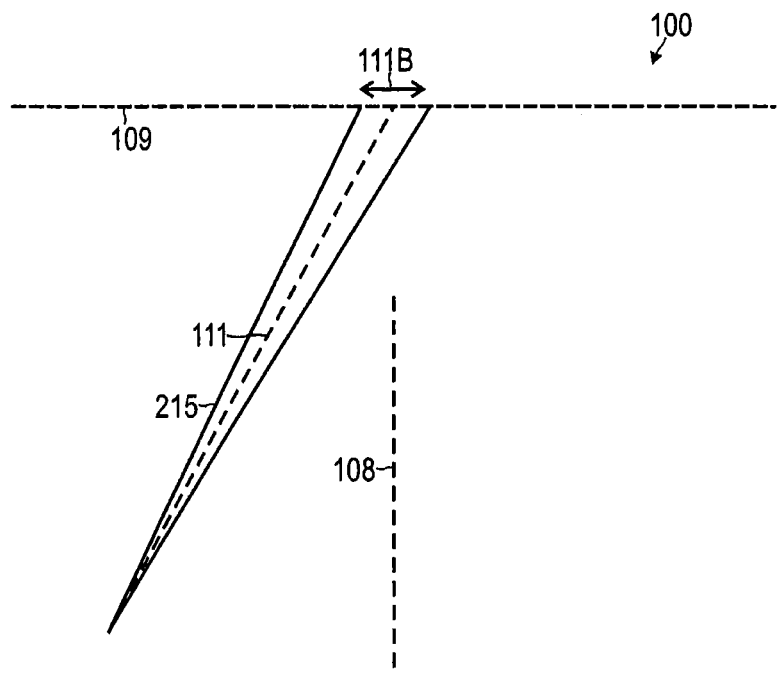
FIG. 2 schematically illustrates the luminous field of an illumination direction without a filter.

It is evident from FIG. 2 that the illumination direction 111 is associated with a luminous field 215 having a certain extent perpendicular to the corresponding central axis (dashed line in FIG. 2). In the example in FIG. 2, the luminous field 215 of the illumination direction 111 is comparatively greatly limited or has a small width. This means that the object arranged in the focal plane 109 (not shown in FIG. 2) is illuminated at a solid angle 111B that is comparatively small. The solid angle 111B is centered around the central axis of the illumination direction 111. In various examples, it would be possible, for example, for the size of the solid angle 111B to be limited by an extent of the corresponding light source of the illumination module (not illustrated in FIG. 2) which is used for illumination under the illumination direction 111. For example, lateral dimensions of solid-state light emitting diodes may be comparatively limited, such that the solid angle 111B also has a comparatively small extent.

Figure 3A:
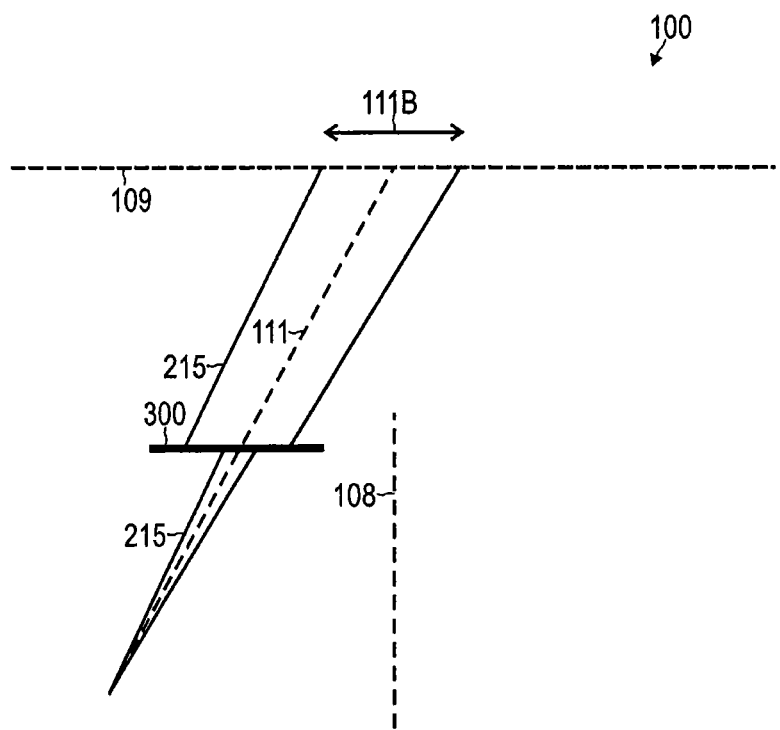
FIG. 3A schematically illustrates the luminous field of the illumination direction from FIG. 2 with a filter in accordance with various embodiments which is configured to expand the luminous field.

FIG. 3A corresponds in principle to FIG. 2, wherein, in the example of FIG. 3A, a filter 300 is used to expand the luminous field 215 of the illumination direction 111. It is evident from the example in FIG. 3A that the extent of the luminous field 215 perpendicular to the beam path of the illumination direction 111 is expanded upon passage through the filter 300. As a result, the object arranged in the focal plane 109 (not illustrated in FIG. 3A) is illuminated from a comparatively large solid angle 111B.

Figure 3B:
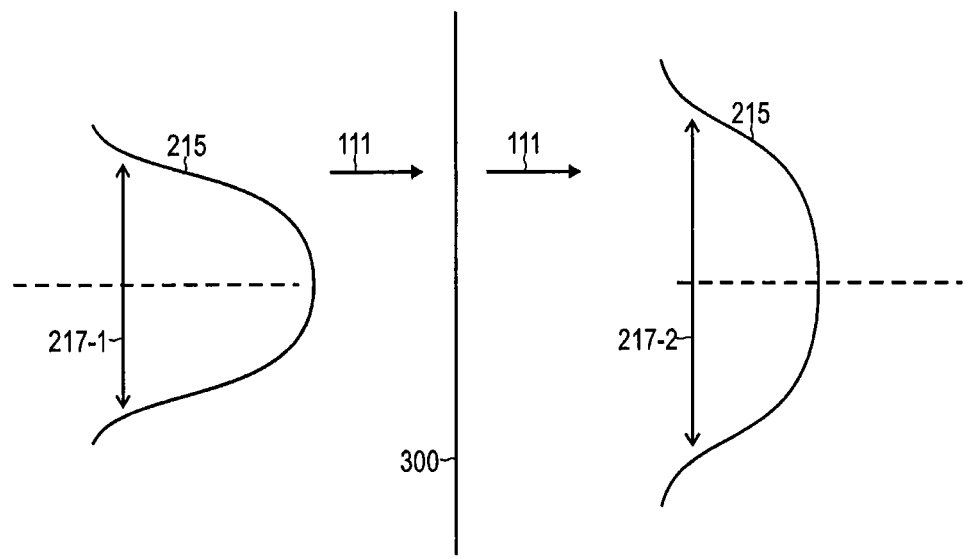
FIG. 3B schematically illustrates the expansion of the luminous field in accordance with various embodiments in greater detail.

FIG. 3B illustrates aspects with regard to expanding the luminous field 215 of the illumination direction 111 by means of the filter 300. FIG. 3B illustrates the amplitude of the luminous field as a function of the lateral position perpendicular to the central axis (dashed line in FIG. 3B) of the illumination direction. Moreover, the light propagation direction is indicated by the arrow. In particular, FIG. 3B illustrates how the width 217-1 of the luminous field 215 upstream of the filter 300 can be expanded in order to obtain the width 217-2 of the luminous field 215 downstream of the filter 300 (illustrated on the right-hand side in FIG. 3B). For example, it is possible to define the width 217-1, 217-2 of the luminous field 215 in relation to a certain decrease in the amplitude of the luminous field relative to a maximum of the amplitude of the luminous field 215. Overall, the maximum amplitude of the luminous field may decrease downstream of the filter 300.

For the various techniques of digital phase contrast imaging, a comparatively large solid angle 111B used for illuminating the object may bring about no, or no significant, limitation with regard to the quality of the result images obtained in this way. In particular, it may be possible, owing to the use of greatly different measurement illumination directions, to achieve a pronounced phase contrast of the result image as a result of the comparatively large dimensioning of the corresponding angle between the different measurement illumination directions. At the same time, however, the use of the comparatively large solid angle 111B can have the effect of reducing the individual artefacts 121,122 in the different measurement images in comparison with a smaller solid angle 111B. This may be caused by the defocused arrangement of the corresponding contaminant: a comparatively large width 217-1,217-2 of the luminous field 215 of the corresponding illumination direction 111, 112 brings about a blurring of the contrast for the individual artefacts 121,122 in the associated measurement images.

Figure 4:
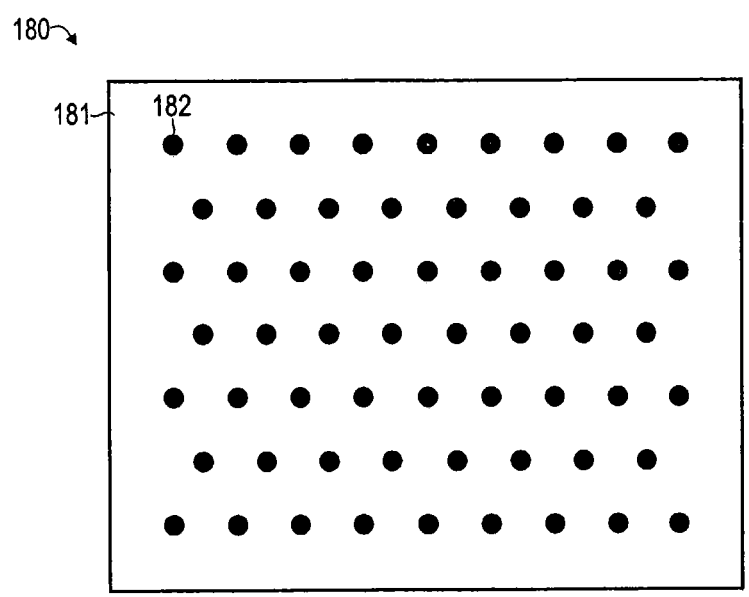
FIG. 4 schematically illustrates an illumination module having a plurality of light sources in accordance with various embodiments, wherein the light sources are implemented as solid-state light emitting diodes.

FIG. 4 illustrates aspects with regard to an illumination module 180 which can be used for the angularly-selective illumination from different illumination directions. The illumination module 180 has a carrier 181, for example composed of metal or plastic. A plurality of light sources 182 are arranged on the carrier. In the example in FIG. 4, the different light sources 182 are arranged in a matrix structure having a hexagonal unit cell on the carrier 181. Other matrix structures are also possible, for example having a square unit cell. For example, it would be possible for the illumination module 180 to be arranged centrally in the region of the optical axis of the optical device 100.

Operating the different light sources 182 makes it possible to implement the illumination of the object from different illumination directions. The greater a distance between the different light sources 182, typically the greater an angle formed by the different illumination directions with one another. In this case, one or more light sources 182 can be activated per measurement image.

A wide variety of types of light sources 182 can be used. In the example in FIG. 4, solid-state light emitting diodes, for instance, are used as light sources 182. The solid-state light emitting diodes have a comparatively limited lateral extent.

Figure 5:
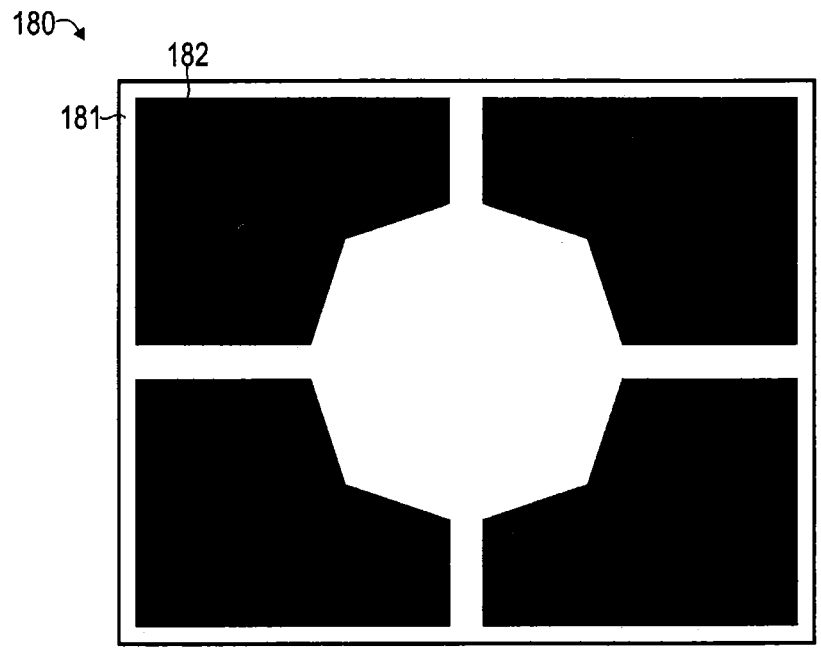
FIG. 5 schematically illustrates an illumination module having a plurality of light sources in accordance with various embodiments, wherein the light sources are implemented as organic light emitting diodes.

FIG. 5 illustrates aspects in relation to an illumination module 180. In the example in FIG. 5, the light sources 182 are configured as organic light emitting diodes. These organic light emitting diodes 182 have a significant lateral extent, for example in comparison with the solid-state light emitting diodes which implement the light sources 182 in the example in FIG. 4. What can be achieved by the use of laterally comparatively extensive light sources 182, as in the example in FIG. 5, is that the luminous field associated with the different corresponding illumination directions already has a comparatively large width. It may then be possible that the filter 300, for example, must perform a relatively small expansion in order to achieve an efficient artefact reduction. As a result, it is possible to limit a reduction of the maximum amplitude of the luminous field by the filter 300. This may increase a signal-to-noise ratio.

Figure 6:
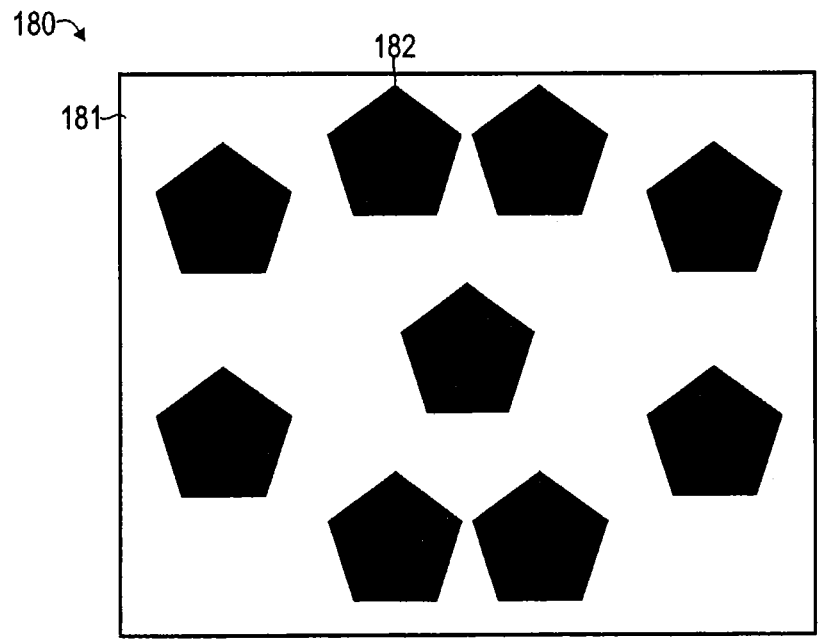
FIG. 6 schematically illustrates an illumination module having a plurality of light sources in accordance with various embodiments, wherein the light sources are implemented as halogen light sources.

FIG. 6 illustrates aspects in relation to an illumination module 180. In the example in FIG. 6, the light sources 182 are embodied as halogen light sources. The halogen light sources also have a comparatively large lateral extent, for example in comparison with the solid-state light emitting diodes which implement the light sources 182 in the example in FIG. 4.

Figure 7:
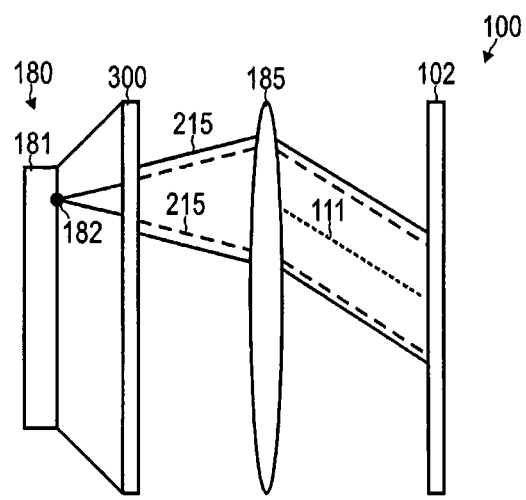
FIG. 7 schematically illustrates the luminous field which is associated with an illumination direction and is expanded by a filter, in accordance with various embodiments.

FIG. 7 illustrates aspects with regard to the filter 300. In the example in FIG. 7, the filter 300 is arranged in the beam path of the optical device 100 between a sample holder 102 and the illumination module 180. In particular, in the example in FIG. 7, the filter 300 is arranged between an imaging optical unit 185, e.g. an objective or a collimator optical unit—of the optical device 100 and the illumination module 180. The filter is configured to expand the assigned luminous field 215 for the different illumination directions—which can be implemented by operating different light sources 182 of the illumination module 180. By way of example, the filter 300 could have a diffusing plate composed of plastic.

In the example in FIG. 7, the filter 300 is arranged in close proximity to the carrier 181 of the illumination module 180. In particular, in the example in FIG. 7, the carrier 181 is rigidly coupled to the filter 300. Such techniques make it possible to carry out a particularly efficient expansion of the luminous field 215 of the illumination direction 111 (in FIG. 7, the non-expanded luminous field 215 is illustrated by a dashed line and the expanded luminous field 215 is illustrated by a solid line).

The optical device 100 can furthermore have a detector (not illustrated in FIG. 7). The detector can be arranged for example using reflected-light geometry, i.e. in FIG. 7 on the left-hand side of the sample holder 102 in the region of the reflected beam path. However, it would also be possible for the detector to be arranged using transmitted-light geometry, that is to say in FIG. 7 on the right-hand side of the sample holder 102 in the region of the transmitted beam path.

Figure 8:
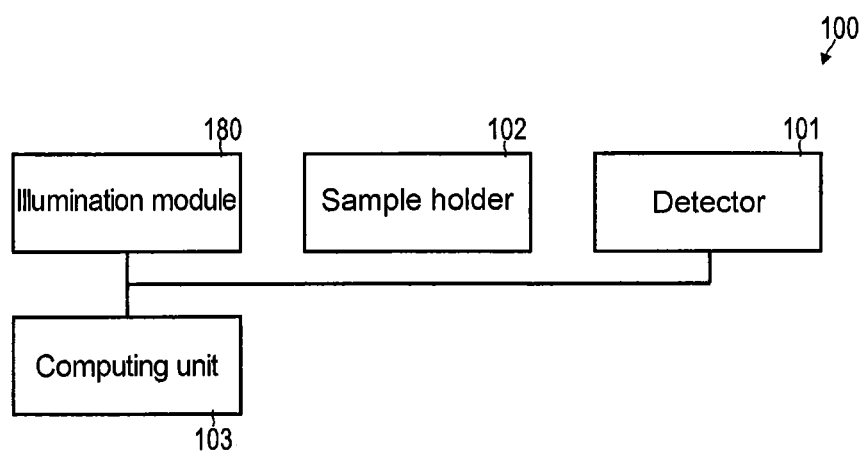
FIG. 8 schematically illustrates an optical device in accordance with various embodiments.

FIG. 8 illustrates aspects with regard to the optical device 100. For example, the optical device 101 could implement a microscope. For example, the optical device 100 could be configured for fluorescence imaging. For example, the optical device could implement a laser scanning microscope.

The optical device 100 has the illumination module 180, the sample holder 102 and a detector 101. As described above, the detector can be arranged for example using reflected-light geometry or transmitted-light geometry with respect to the illumination module 180 and the sample holder 102. For example, the detector can be a CCD detector or a CMOS detector.

The optical device 100 also has a computing unit 103, for example a processor and/or a computer and/or an ASIC. The computing unit 103 is configured to control the illumination module 180 and to control the detector 101. Optionally, the computing unit 103 could also be configured to control the sample holder 102 for focusing the object; a manual focusing of the object by way of adjusting the sample holder 102 by hand would also be conceivable.

By means of the computing unit 103 it is possible to carry out a digital post-processing of images that are captured by the detector 101. For example, the computing unit could be configured to control the illumination module 180 for illuminating the object from a plurality of measurement illumination directions. The computing unit 103 can also be configured to control the detector for capturing measurement images of the object, wherein the measurement images are assigned to the measurement illumination directions.

Different assignments between the measurement images and the measurement illumination directions are possible, that is to say that a 1:n assignment with n>=1 can be implemented. In this case, n can vary or be identical for different measurement images. In this case, it is possible to carry out a separation of the measurement illumination directions for the different measurement images e.g. in the time domain, color space or polarization space. That means that it would be possible, for example, to process time-sequentially the measurement illumination directions assigned to the different measurement images. Alternatively or additionally, however, it would also be possible to capture measurement images at least partly in a time-parallel manner; in this case, it is possible to differentiate between the different measurement illumination directions e.g. by way of the spectral range, i.e. the color, of the light and/or the polarization. Corresponding filters can be provided.

The computing unit could then furthermore be configured to combine the measurement images in order to obtain a result image. What can be achieved by combining the measurement images associated with different illumination directions is that the result image has a phase contrast. By means of suitable combination, a wide variety of conventional phase contrast techniques can be simulated or emulated, for example phase contrast according to Waller, DPC phase contrast, Zernike phase contrast, etc. Bright-field imaging can also be implemented.

While a hardware-based artefact reduction can be carried out—in real time—with the use of the filter 300, in various examples it may alternatively or additionally be possible for the computing unit 103 to be configured for a software-based artefact reduction. The software-based artefact reduction can also be carried out in real time in various examples. For example, it would be possible to carry out, for each measurement image, an artefact reduction that reduces a corresponding artefact 121, 122 in the respective measurement image on account of a contaminant 120 arranged in a defocused manner. Then, after carrying out the artefact reduction for all the measurement images, it is possible for the measurement images to be combined in order to obtain a result image having a phase contrast.

In order to carry out a particularly accurate software-based artefact reduction, it may be possible to take into account, in addition to the measurement images—on the basis of which the result image is determined—, reference images associated with reference illumination directions. The information basis for the artefact reduction can be extended as a result.

Figure 9:
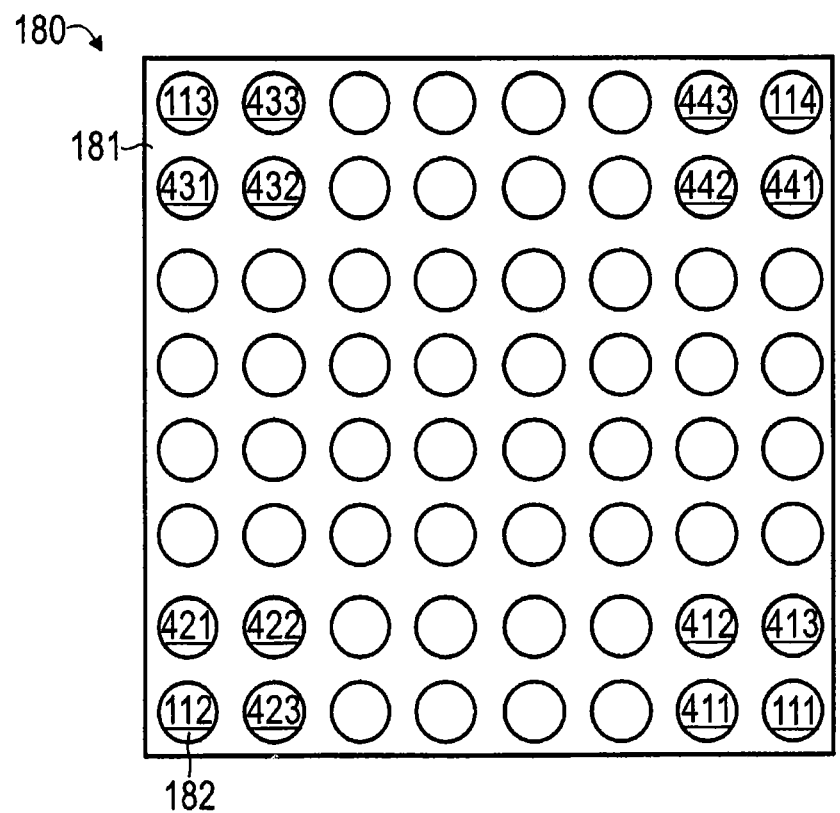
FIG. 9 schematically illustrates an illumination module having a plurality of light sources in accordance with various embodiments and furthermore illustrates different measurement illumination directions and respectively assigned reference illumination directions in accordance with various embodiments.

FIG. 9 illustrates aspects with regard to reference illumination directions 411-413, 421-423, 431-433, 441-443. The example in FIG. 9 illustrates how the illumination module 180, for different measurement images associated with different measurement illumination directions 111-114, can be controlled for illuminating the object from respectively three assigned reference illumination directions 411-413, 421-423, 431-433, 441-443. For each reference illumination direction 411-413, 421-423, 431-433, 441-443, the detector 101 can then be driven to capture an associated reference image of the object. In this case, e.g. the measurement illumination direction 111 is assigned to the reference illumination directions 411-413. In this case, e.g. the measurement illumination direction 112 is assigned to the reference illumination directions 421-423. In this case, e.g. the measurement illumination direction 113 is assigned to the reference illumination directions 431-433. In this case, e.g. the measurement illumination direction 114 is assigned to the reference illumination directions 441-443.

It is evident from FIG. 9 that the reference illumination directions 411-413, 421-423, 431-433, 441-443 are grouped in each case around the corresponding measurement illumination direction 111-114, wherein however, the reference illumination directions 411-413, 421-423, 431-433, 441-443 are different than the measurement illumination directions 111-114. In particular, the measurement illumination directions 111-114 and the assigned reference illumination directions 411-413, 421-423, 431-433, 441-443 correspond to light sources 182 of the illumination module 180 that are closest to one another. What can be achieved as a result is that an average angle formed by the different reference illumination directions 411-413, 421-423, 431-433, 441-443 assigned to a measurement illumination direction 111-114 with one another is smaller than an average angle formed by the different measurement illumination directions 111-114 with one another.

Figure 10:
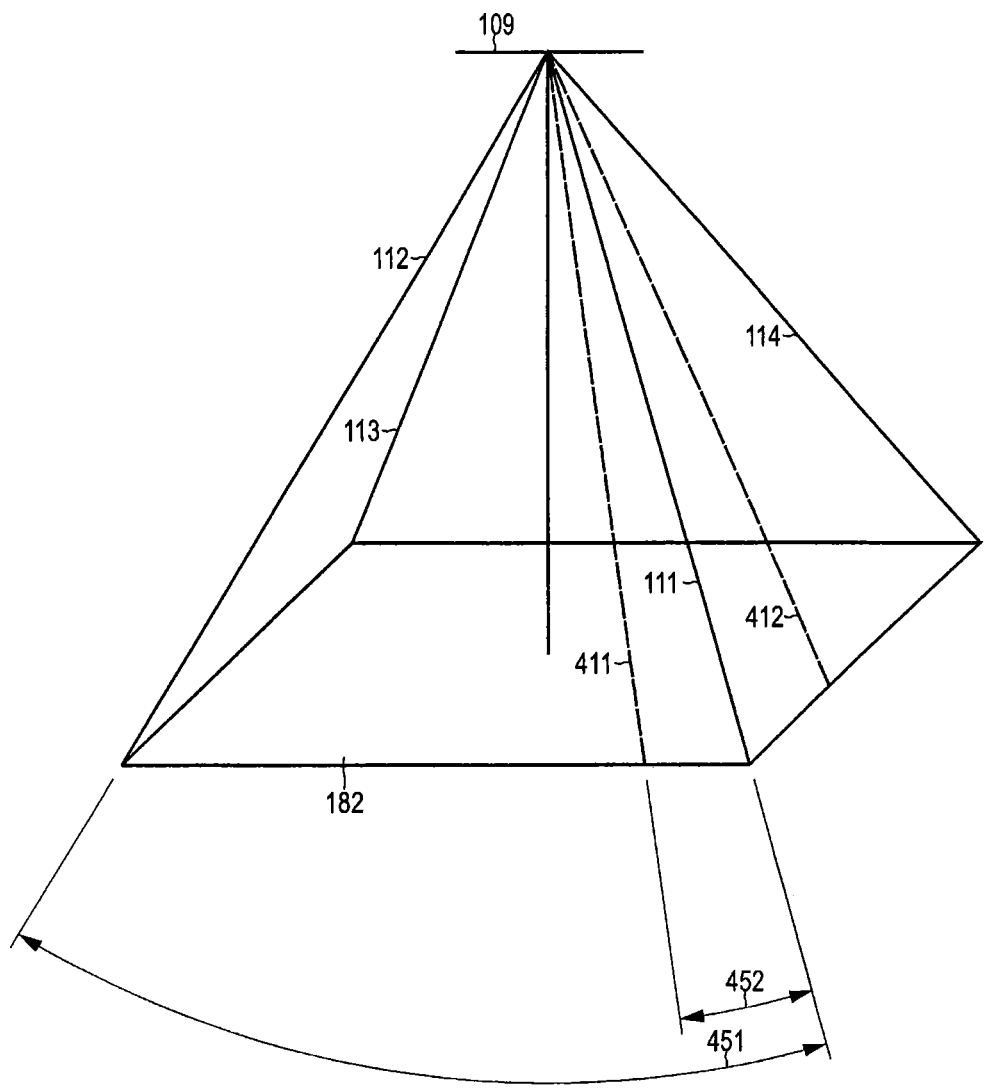
FIG. 10 illustrates the measurement illumination directions and the reference illumination directions in accordance with FIG. 9 in greater detail.

FIG. 10 illustrates aspects with regard to angles 451, 452 between reference illumination directions 411,412 and measurement illumination directions 111-114. In particular, FIG. 10 illustrates a perspective view of the scenario from FIG. 9, wherein FIG. 10 does not illustrate all of the reference illumination directions, for reasons of clarity.

FIG. 10 illustrates an angle 452 formed by the measurement illumination direction 111 with the reference illumination direction 411. It is evident from FIG. 10 that said angle 452 is significantly smaller than an angle 451 formed by the measurement illumination direction 111 with the measurement illumination direction 112. The same correspondingly also applies to the average angle between the measurement illumination direction and the reference illumination directions 411-413. This is the case since non-adjacent light sources 182 of the illumination module 180 are used for the different measurement illumination directions 111-114 (cf. FIG. 9); while light sources 182 of the illumination module 180 that are closest to the respective light source associated with the corresponding measurement illumination direction 111 are used for the reference illumination directions 411-412.

Figure 11:
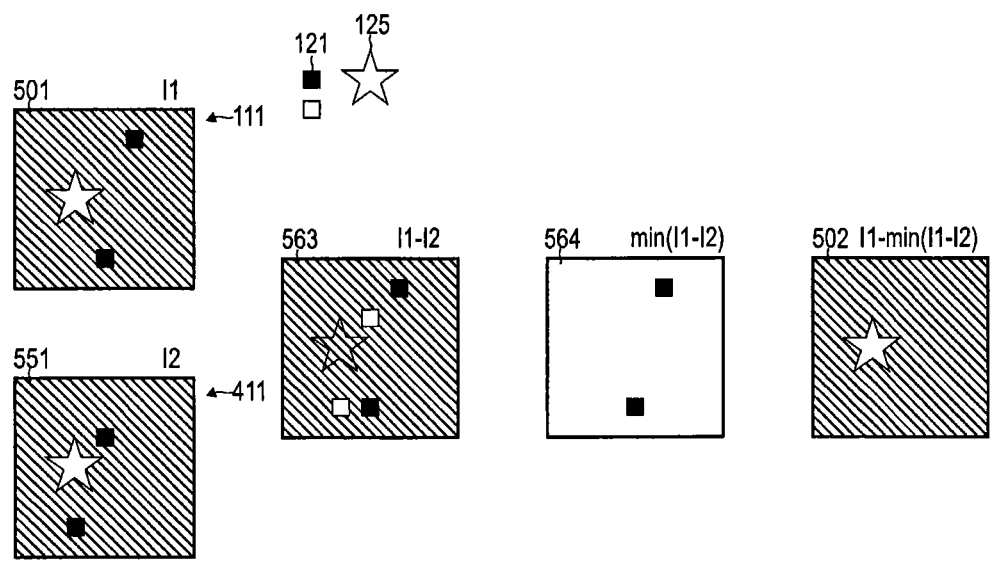
FIG. 11 schematically illustrates the process of carrying out an artefact reduction on the basis of correction images that are indicative of the artefact, in accordance with various embodiments.

FIG. 11 illustrates aspects with regard to a digital artefact reduction. In the example in FIG. 11, the artefact reduction is based on the use of a reference illumination direction 411 to which a corresponding reference image 551 is assigned. FIG. 11 also illustrates the associated measurement image 501. The different images 501,551 image the object 125 and have artefacts 121. Moreover, the images 501, 551 have a background (illustrated in a diagonally striped manner in FIG. 11). The aim of the artefact reduction is to suppress the artefacts 121, but to preserve as far as possible the object 125 and the background.

It is evident from a comparison of the measurement image 501 with the associated reference image 551 that the artefacts 121 have significantly changed their position, while the object 125 remains substantially fixed in place. This is the case since the associated contaminant 120 (not illustrated in FIG. 11) is arranged in a defocused manner outside the focal plane 109 of the optical device 100 and, as a result, the influence on the position change as a result of the angle between the reference illumination direction 411 and the measurement illumination direction 111 for the imaging of the contaminant 120 as the artefact 121 is particularly great (cf. equation 1). Since the object 125 is arranged in the focal plane 109, it has no, or no significant, position change between the measurement image 501 and the reference image 551 (cf. equation 1); it should be understood here that for an object 125 extended in the depth direction (i.e. parallel to the beam path) there may also be a certain position change between the measurement image 111 and the reference image 411, in particular for regions of the object 125 that are arranged in a defocused manner. Therefore, it may be worthwhile, in principle, to dimension the angle 452 between the reference illumination direction 411 and the measurement illumination direction 111 such that it is comparatively small, in order to result in the smallest possible dimensioning of said position change with respect to the object 125.

In the example in FIG. 11, combining the measurement image 501 with the assigned reference image 551 in order to obtain a correction image 563 is carried out. In the example in FIG. 11, the combining is carried out by subtracting the reference image 551 from the measurement image 501. The correction image 563 in the example in FIG. 11 then has a negative contrast (shown black in FIG. 11) and a positive contrast (shown white in FIG. 11) for the artefacts 121, wherein the negative contrast is associated with the position of the artefacts in the measurement image 501 and the positive contrast is associated with the position of the artefacts 121 in the reference image 551. The object 125 is still present in outline form in the correction image 563 since, as described above, there may be a small position change of the object 125 between the measurement image 501 and the reference image 551. The same correspondingly applies to the background. However, the intensity of the object 125 and of the background is greatly reduced.

An image segmentation is then applied to the correction image 563; in this case, the image segmentation is based on an intensity threshold value. On the basis of the image segmentation it is possible to obtain an isolated artefact region in the correction image 564, said artefact region including the artefact 121. The artefact 121 can then be removed from the measurement image 501 by once again subtracting the artefact region of the correction image 564 from the measurement image 501 in order to obtain a corrected measurement image 502.

In the example in FIG. 11, the contaminants 120 are absorbers; therefore, the artefacts 121 appear with negative contrast in the measurement image 501 and the reference image 551. In other examples it is also possible for the contaminants to be scatterers, such that the artefacts appear with positive contrast in the corresponding measurement images and reference images.

Figure 12:
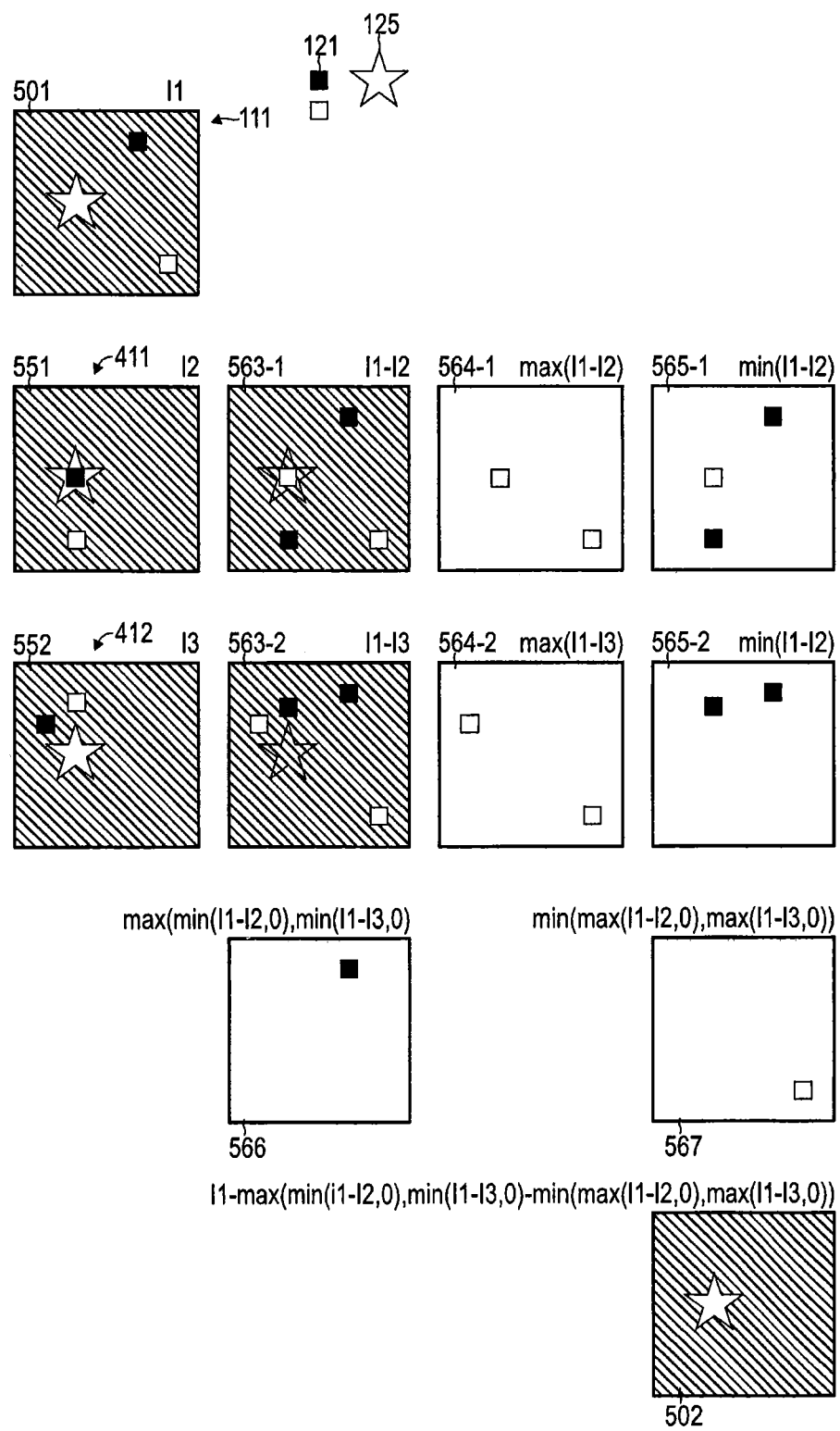
FIG. 12 schematically illustrates the process of carrying out an artefact reduction on the basis of correction images that are indicative of the artefact, in accordance with various embodiments.

In some examples, it may also be possible for the contaminants 120 to have both absorbers and scatterers. One such example is illustrated with reference to FIG. 12. FIG. 12 illustrates aspects in relation to digital artefact reduction.

The scenario in FIG. 12 corresponds, in principle, to the scenario in FIG. 11, but two reference images 551, 552 are used instead of a single reference image, said reference images being captured for respectively different reference illumination directions 411,412. By using a greater number of reference illumination directions 411, 412 or a greater number of reference images 551, 552, it may be possible to carry out a particularly accurate artefact reduction even in the presence of artefacts 121 corresponding to scatterers and absorbers.

In detail, a correction image 563-1 is obtained by difference formation between the measurement image 501 and the reference image 551. A correction image 563-2 is obtained by difference formation between the measurement image 501 and the reference image 552. The correction images 564-1 and 565-1 are obtained respectively by image segmentation of the correction image 563-1 relating to a positive and negative intensity threshold value. The correction images 564-2 and 565-2 are obtained respectively by image segmentation of the correction image 563-2 relating to a positive and negative intensity threshold value. The correction images 564-1, 564-2, 565-1, 565-2 therefore define isolated artefact regions corresponding to the different artefacts 121. In this case, the different artefact regions of the correction images 564-1 and 565-1 are subsequently corrected on the basis of the artefact regions of the correction images 564-2 and 565-2 (or the other way around) in order to obtain the correction images 566 and 567. In detail, the correction image 566 is generated by applying a further image segmentation on the basis of a positive intensity threshold value with respect to the correction images 565-1 and 565-2. The correction image 567 is generated by applying a further image segmentation on the basis of a negative intensity threshold value with respect to the correction images 564-1 and 564-2.

As a result, it is possible to determine the artefacts 121 in the measurement image 501 which respectively correspond to absorbers (correction image 566) and scatterers (correction image 567). This can be utilized in order to generate a corrected measurement image 502 by combining the measurement image 501 with the correction images 566 and 567.

Figure 13:
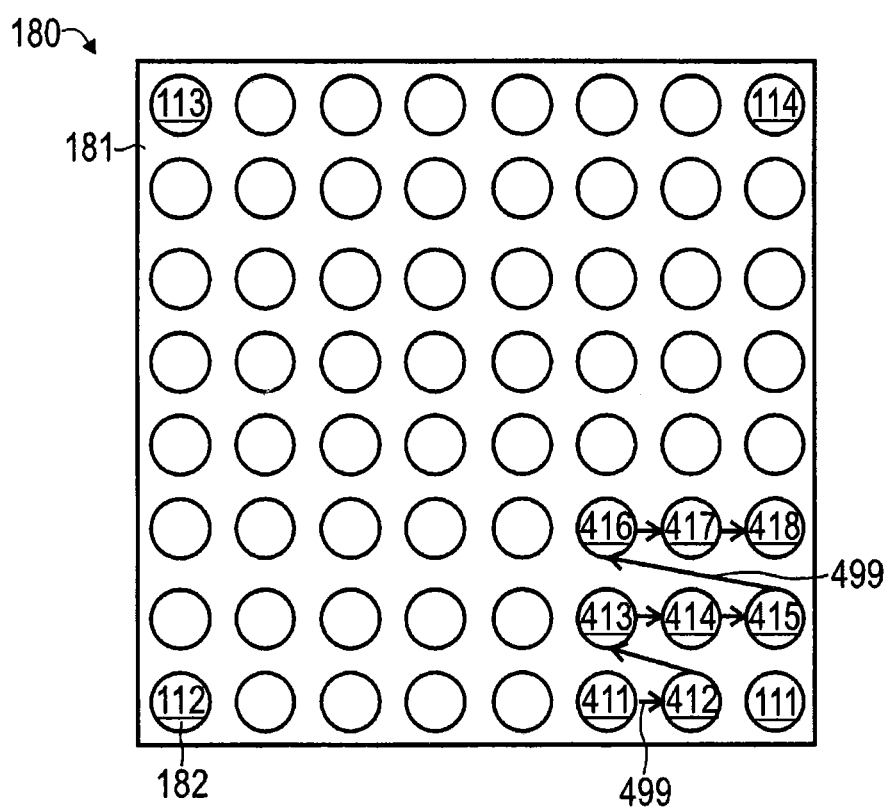
FIG. 13 schematically illustrates an illumination module having a plurality of light sources in accordance with various embodiments and furthermore illustrates a sequence of reference illumination directions for a measurement illumination direction in accordance with various embodiments.

FIG. 13 illustrates aspects with regard to a sequence 499 of reference illumination directions 411-418. The reference illumination directions 411-418 are assigned to the measurement illumination direction 111 (in FIG. 13, the reference illumination directions for the measurement illumination directions 112-114 are not illustrated, for reasons of clarity). It is evident from FIG. 13 that the sequence 499 is defined with respect to a spatial succession of the reference illumination directions 411-418. Adjacent elements of the sequence 499 therefore correspond to adjacent reference illumination directions 411-418. In this case, it is unnecessary in principle for a temporal order with which the sequence 499 is processed and corresponding reference images are captured to correspond to said spatial succession of the sequence 499.

Figure 14:
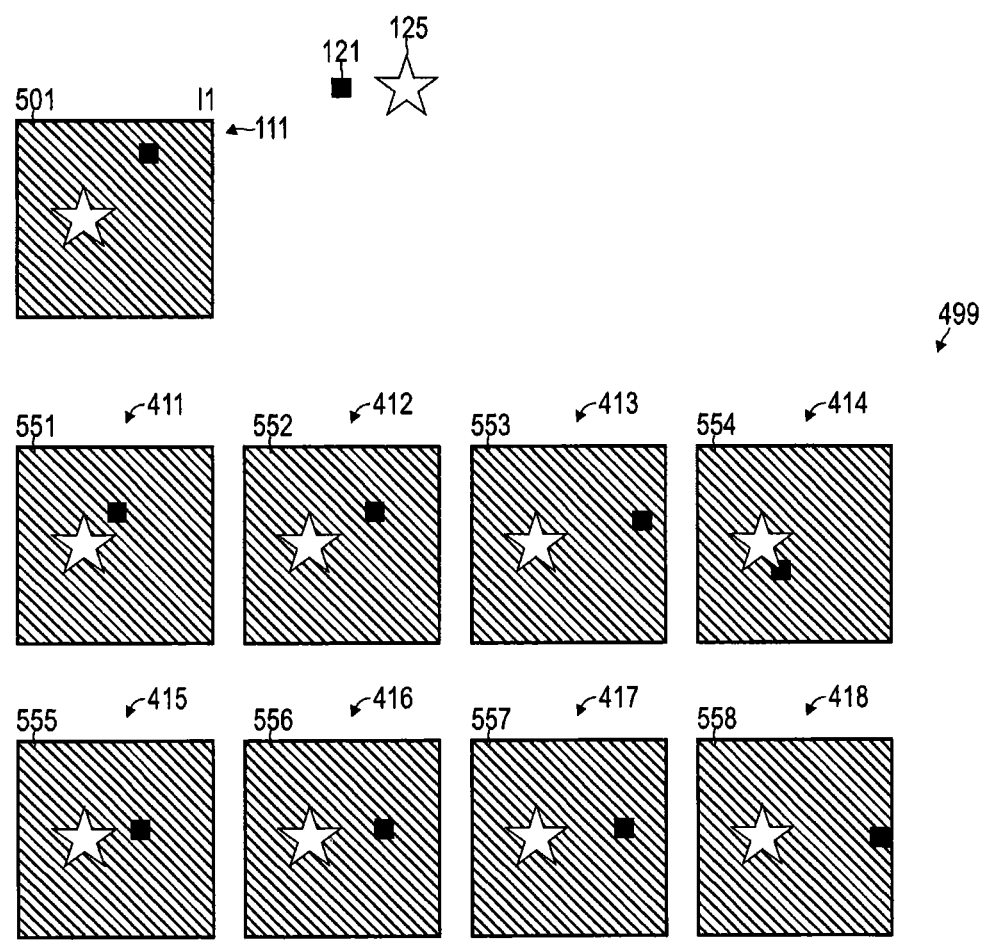
FIG. 14 schematically illustrates the movement of the artefact as a function of the sequence of the reference illumination directions from FIG. 13.

FIG. 14 illustrates the different reference images 551-558 corresponding to the reference illumination directions 411-418 of the sequence 499. It is evident from FIG. 14 that on account of the spatial succession there is a systematic movement of the artefact 121 in the different reference images 551-558. It is possible to identify the movement of the artefact 121 as a function of the respective sequence 499 in the reference images 551-558. It may then be possible for the artefact reduction to be carried out on the basis of the identified movement of the artefact. For example, it would be possible that, given identified movement of the artefact 121, the artefact 121 can be computationally extracted from the measurement image 501. To that end, it may be possible for the measurement image 501 to be combined with at least one of the assigned reference images 551-558 on the basis of the identified movement of the artefact 121.

In this case, various techniques can be used for identifying the movement of the artefact 121 in the sequence 499.

Techniques of image segmentation and/or edge recognition can be used, for example. Optimization techniques can also be used. Corresponding techniques for identifying the movement are known for example from the article by XUE T. et al. cited above.

Figure 15:
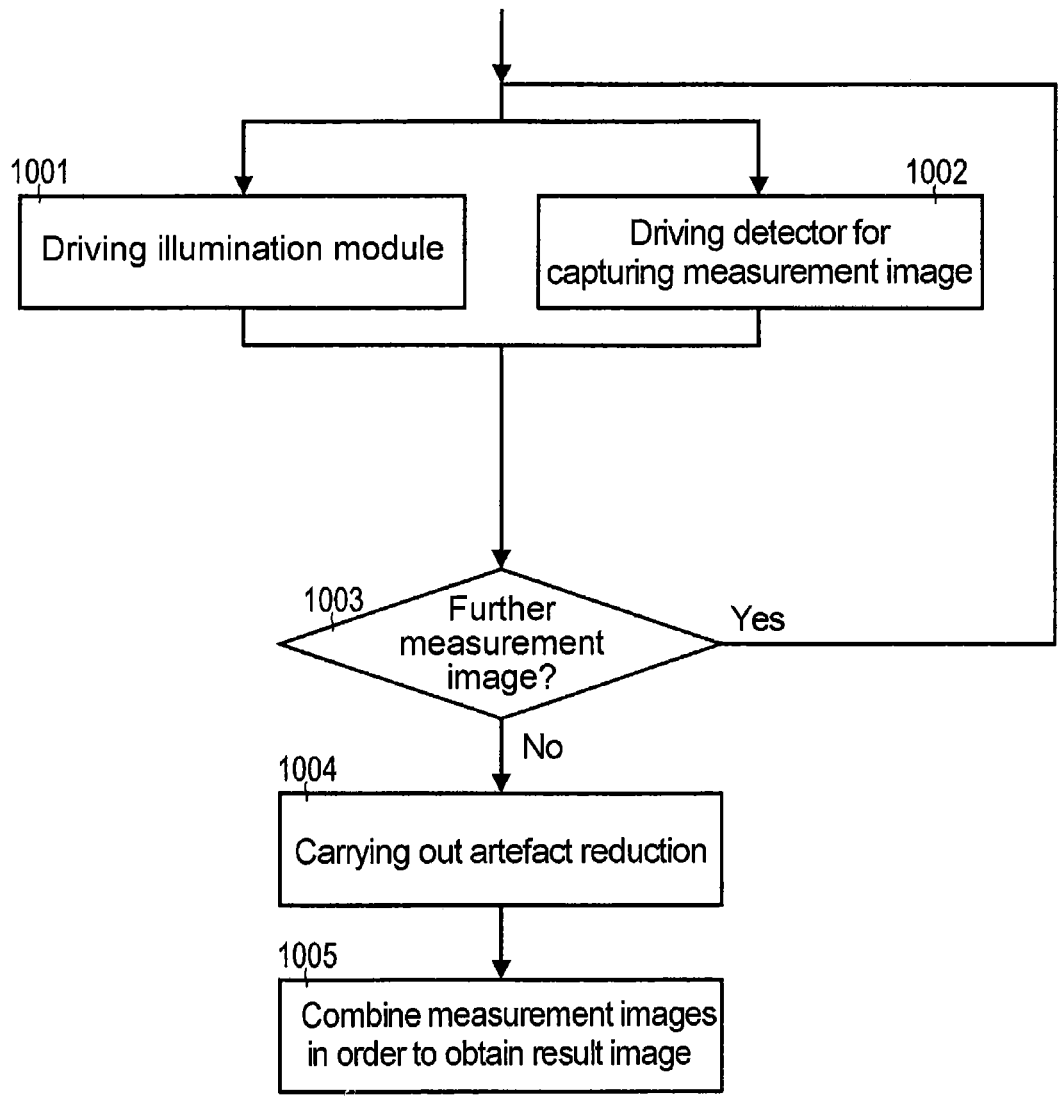
FIG. 15 is a flowchart of a method in accordance with various embodiments.

FIG. 15 is a flowchart of one exemplary method. In this case, steps 1001 and 1002 involve respectively driving the illumination module 180 and the detector 101 in order to capture a respective associated measurement image 501 for different measurement illumination directions 111-114. In this case, it is possible to implement more than one illumination direction per measurement image 501: to that end, e.g. in 1001 the illumination module 180 can be controlled in such a way that more than one light source 182 is activated.

1003 involves checking whether a further measurement image 501 is required; if this is the case, then steps 1001 and 1002 are carried out again. For example, in 1003 it is possible to take account of whether phase contrast imaging is intended to be carried out—and if so, what type of phase contrast imaging is intended to be employed. By way of example, a different number of measurement images 501 may be required depending on the type of phase contrast imaging.

If it is ascertained in step 1003 that no further measurement image 501 is required, then step 1004 involves carrying out the artefact reduction for each measurement image 501 captured previously in the different iterations of step 1002, in order to obtain a corrected measurement image 502 in each case.

The artefact-reduced measurement images 502 are then combined with one another in step 1005 in order to obtain a result image. The result image may optionally have a phase contrast.

In various examples, it would be possible for the artefact reduction in step 1004 to be carried out multiply, i.e. in a plurality of iterations. For example, it would be possible for an artefact-reduced measurement image 502 to be generated in each case in a plurality of iterations. For example, the operations described above with reference to FIGS. 11 and 12 could be carried out multiple times and iteratively in order to achieve an improved artefact reduction in each case.

Step 1004 could e.g. also be carried out before step 1003, i.e. in each case for the measurement image captured previously.

A wide variety of techniques can be used for carrying out the artefact reduction in step 1004. By way of example, it may be possible to determine, on the basis of one or more reference images 551, 552, a correction image that is indicative of the artefact 121 in the associated measurement image 501; to that end, an image segmentation can be carried out, for example, as explained above with reference to FIGS. 11 and 12. Alternatively or additionally, it would also be possible to capture a sequence 499 of reference images 551-558 and to identify a movement of the artefact 121 in the sequence 499. The artefact reduction can then be carried out on the basis of the identified movement. Such techniques at all events involve capturing one or more reference images 551-558.

Figure 16:
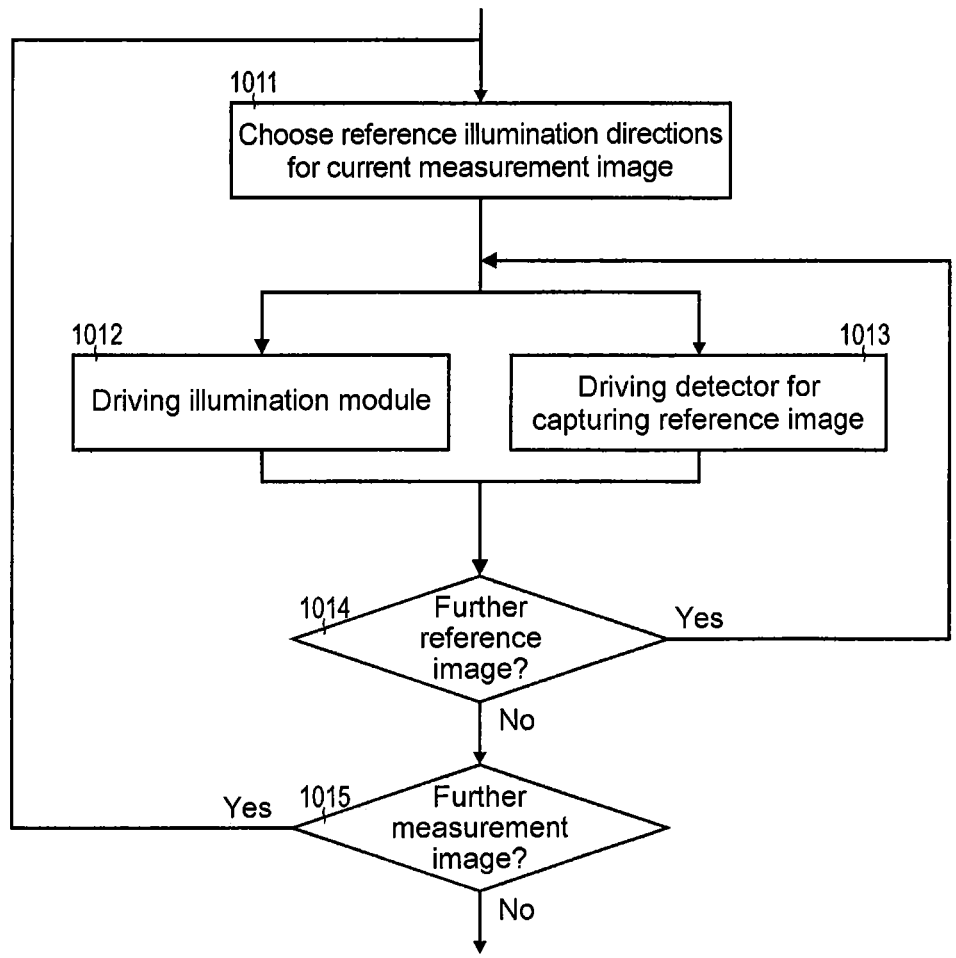
FIG. 16 is a flowchart of a method in accordance with various embodiments.

FIG. 16 is a flowchart of a method in accordance with various examples. FIG. 16 illustrates aspects with regard to capturing one or more reference images 551-558.

In this case, firstly, in step 1011, one or more reference illumination directions 411-418 are selected for a current measurement illumination direction 111 or for a current measurement image 501.

Steps 1012 and 1013 then involve driving the illumination module 180 and the detector 101 in a time-synchronized manner in order to capture an associated reference image 551-558 in each case for a current reference illumination direction 411-418. Step 1014 involves checking whether a further reference image 551-558 need be captured; if this is the case, steps 1012 and 1013 are carried out again.

In some examples, a single reference illumination direction 411-418 can be implemented for each reference image 551-558. In other examples, however, it would also be possible for more than a single reference illumination direction 411-418 to be assigned to at least some reference images 551-558. To that end, e.g. in 1012, the illumination module 180 can be controlled in such a way that more than one light source 182 is activated.

Step 1015 involves checking whether one or more reference images should be captured for a further measurement image 501. If this is the case, steps 1011-1014 are carried out again.

Steps 1011-1015 for capturing the reference images 551-558 can be carried out for example before or after capturing the different measurement images 502, i.e. before or after carrying out steps 1001 and 1002. It would also be possible for capturing the reference images 551-558 to be carried out in a manner temporally overlapping the capturing of the measurement images 502. This may be worthwhile particularly in the case of temporally variable sample objects, in order to avoid movement artefacts.

Figure 17:
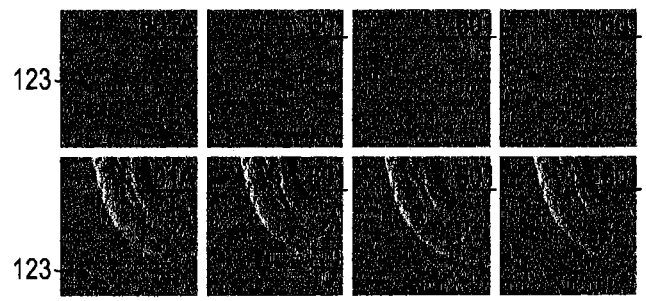
FIG. 17 illustrates result images determined on the basis of an artefact reduction in accordance with various embodiments.

FIG. 17 illustrates aspects with regard to result images 601, obtained on the basis of the combination of different measurement images which were previously corrected on the basis of one or more iterations of the artefact reduction as described above with reference to FIG. 12. Uncorrected result images 601A are also illustrated for comparison. It is evident from FIG. 17 that the quality of the artefact reduction increases for a larger number of iterations. However, a significant suppression of the artefact 123 can be achieved even with one iteration of the artefact reduction.

To summarize, a description has been given above of techniques for carrying out artefact reduction during angularly-selective illumination with a plurality of discretely arranged light sources. The techniques are based on the insight that contaminants arranged in a defocused manner during the angularly-selective illumination are amplified to form extensive artefacts having a pattern corresponding to the structured illumination pupil.

Although the invention has been more specifically illustrated and described in detail by means of the preferred exemplary embodiments, nevertheless the invention is not restricted by the examples disclosed and other variations can be derived therefrom by the person skilled in the art, without departing from the scope of protection of the invention.

By way of example, a description has been given above of various examples with regard to phase contrast imaging. However, it is possible for the techniques described herein e.g. also to be applied to conventional bright-field imaging in which a structured illumination is used. In this case, during bright-field imaging it may be worthwhile to activate as many as possible or all of the light sources of the corresponding illumination module in order in this way to achieve a uniform illumination of the object from different spatial directions.

Furthermore, a description has been given above of various examples in which the different measurement images are assigned in each case to a single measurement illumination direction. In other examples, however, it would also be possible for the different measurement images to be assigned to more than a single measurement illumination direction, e.g. two, three or more measurement illumination directions. In such cases, too, the techniques for artefact correction as described herein can be applied.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS 111-114 Illumination direction
100 Optical device
101 Detector
102 Sample holder
103 Computing unit
105 Position change
108 Optical axis
109 Focal plane
111A Angle
111B Angle
120 Contaminant
121 Artefact
122 Artefact
123 Artefact
125 Object
180 Illumination module
181 Carrier
182 Light source
185 Imaging optical unit
215 Luminous field
217-2 Width of the luminous field
217-1 Width of the luminous field
300 Filter
451 Angle
452 Angle
501 Measurement image
502 Corrected measurement image
566 Correction image
567 Correction image
601 Result image
601A Result image
411-418 Illumination direction
421-423 Illumination direction
431-433 Illumination direction
441-443 Illumination direction
551-558 Reference image
565-1, 565-2 Correction image
563, 563-1, 563-2 Correction image
564, 564-1, 564-2 Correction image
1001-1005 Step
1011-1015 Step

What is claimed is:

1. A method, comprising:
controlling an illumination module of an optical device having a plurality of light sources for illuminating an object from a plurality of measurement illumination directions;
controlling a detector of the optical device for capturing measurement images of the object, wherein the measurement images are assigned to the measurement illumination directions;
carrying out, for each measurement image, an artefact reduction which reduces an artefact in the respective measurement image on account of a contaminant arranged in defocused fashion;
after carrying out the artefact reductions for all the measurement images, combining the measurement images in order to obtain a result image;
driving, for each measurement image, the illumination module for illuminating the object from at least one assigned reference illumination direction;
driving, for each reference illumination direction, the detector for capturing a reference image of the object;
when carrying out the artefact reduction, for each measurement image, combining the respective measurement image with the at least one assigned reference image in order to obtain at least one correction image which is indicative of the artefact;
wherein the contaminant comprises scatterers and absorbers,
wherein the illumination module is driven for illuminating the object from at least two assigned reference illumination directions for each measurement image; and
wherein the method further comprises:
when carrying out the artefact reduction, for each correction image, correcting the respective artefact region on the basis of the artefact region of a further correction image.

2. The method as claimed in claim 1, further comprising:
when carrying out the artefact reduction, for each correction image, applying an image segmentation on the basis of an intensity threshold value in order to obtain an isolated artefact region in the correction image, said artefact region including the artefact; and
when carrying out the artefact reduction, for each measurement image, removing the artefact on the basis of the artefact region.

3. The method as claimed in claim 1, further comprising:
driving, for each measurement image, the illumination module for illuminating the object from an assigned sequence of reference illumination directions;
driving, for each reference illumination direction, the detector for capturing a reference image of the object; and
when carrying out the artefact reduction, for each measurement image, identifying a movement of the artefact as a function of the respective sequence of the reference illumination directions in the assigned reference images and wherein the respective artefact reduction is based on the respectively identified movement of the artefact.

4. The method as claimed in claim 3, further comprising:
when carrying out the artefact reduction, for each measurement image, combining the respective measurement image with at least one of the assigned reference images on the basis of the identified movement of the artefact.

5. The method as claimed in claim 1,
wherein the at least one measurement illumination direction which is assigned to a selected measurement image forms a first average angle with the other measurement illumination directions, and wherein the at least one measurement illumination direction which is assigned to the selected measurement image forms a second average angle with the assigned at least one reference illumination direction, said second average angle being smaller than the first average angle.

6. The method as claimed in claim 1, wherein the at least one measurement illumination direction which is assigned to the selected measurement image and the assigned at least one reference illumination direction corresponds to nearest neighbor light sources of the illumination module.

7. The method as claimed in claim 1, wherein the reference illumination directions are at least partly different from the measurement illumination directions.

8. The method as claimed in claim 1, further comprising:
controlling a sample holder of the optical device, said sample holder being configured to fix the object in the beam path of the optical device, for focusing the object.

9. The method as claimed in claim 1, wherein the artefact reduction is carried out multiple times and iteratively for each measurement image.

10. The method as claimed in claim 1, wherein carrying out the artefact reduction occurs in real time.

11. An optical device, comprising:
a sample holder configured to fix an object in the beam path of the optical device;
an illumination module having a plurality of light sources and configured to illuminate the object from a plurality of illumination directions by operating the light sources;
a detector arranged in the beam path of the optical device; and
a computing unit configured to control the illumination module for illuminating an object from a plurality of measurement illumination directions;
wherein the computing unit is configured to control the detector for capturing measurement images of the object, wherein the measurement images are assigned to the measurement illumination directions,
wherein the computing unit is configured, for each measurement image, to carry out an artefact reduction which reduces an artefact in the respective measurement image on account of a contaminant arranged in defocused fashion,
wherein the computing unit is configured, after carrying out the artefact reduction for all the measurement images, to combine the measurement images in order to obtain a result image;
driving, for each measurement image, the illumination module for illuminating the object from at least one assigned reference illumination direction;
driving, for each reference illumination direction, the detector for capturing a reference image of the object;
when carrying out the artefact reduction, for each measurement image, combining the respective measurement image with the at least one assigned reference image in order to obtain at least one correction image which is indicative of the artefact;
wherein the contaminant comprises scatterers and absorbers,
wherein the illumination module is driven for illuminating the object from at least two assigned reference illumination directions for each measurement image; and
wherein the method further comprises:
when carrying out the artefact reduction, for each correction image, correcting the respective artefact region on the basis of the artefact region of a further correction image.

12. The optical device as claimed in claim 11, wherein the optical device is configured to carry out the method as claimed in claim 1.

* * * * *